US011250524B2

(12) United States Patent
Craparo et al.

(10) Patent No.: US 11,250,524 B2
(45) Date of Patent: *Feb. 15, 2022

(54) FACILITATING BEVERAGE ORDERING AND GENERATION

(71) Applicant: Costa Express Ltd., High Wycombe (GB)

(72) Inventors: John Serafino Craparo, Georgetown, TX (US); Charles F. Studor, Austin, TX (US); J. Kevin Nater, Austin, TX (US); Jeffrey William Mulhausen, Austin, TX (US); Marwan Hassoun, Sudbury, MA (US)

(73) Assignee: COSTA EXPRESS LTD., High Wycombe (GB)

( * ) Notice: Subject to any disclaimer, the term of this patent is extended or adjusted under 35 U.S.C. 154(b) by 20 days.

This patent is subject to a terminal disclaimer.

(21) Appl. No.: 16/053,276

(22) Filed: Aug. 2, 2018

(65) Prior Publication Data

US 2018/0342022 A1 Nov. 29, 2018

Related U.S. Application Data

(63) Continuation of application No. 14/806,261, filed on Jul. 22, 2015, now Pat. No. 10,043,226.

(Continued)

(51) Int. Cl.
G06Q 50/12 (2012.01)
G07F 13/06 (2006.01)
(Continued)

(52) U.S. Cl.
CPC ......... G06Q 50/12 (2013.01); G06Q 10/0836 (2013.01); G06Q 20/18 (2013.01); G06Q 30/0635 (2013.01); G07F 13/06 (2013.01)

(58) Field of Classification Search
None
See application file for complete search history.

(56) References Cited

U.S. PATENT DOCUMENTS 2,814,317 A 11/1957 Gale
4,628,974 A 12/1986 Meyer
(Continued)

FOREIGN PATENT DOCUMENTS

EP 1637055 A2 3/2006
GB 2442223 A 4/2008
(Continued)

OTHER PUBLICATIONS

Savage, Scott "Systems, methods and apparatus for one touch ordering" IP.com prior art database IPCOM000250871D, Sep. 11, 2017 (Year: 2017).*

(Continued)

Primary Examiner — Oluseye Iwarere
(74) Attorney, Agent, or Firm — Reising Ethington P.C.

(57) ABSTRACT

A system and method for facilitating the ordering and generation of a beverage. The system and method are configured to receive an electrical signal in response to the activation by a second user of an electronic link corresponding to a recipe for the beverage shared by a first user. The system and method are further configured to generate a user interface having a user-selectable or user-inputtable order field for allowing the second user to order the beverage. The system and method are still further configured to receive an order for the beverage responsive to a user input made via the order field, and The system and method are yet still further configured to command the generation of the beverage responsive to the receipt of the order, and to effect the presentation of the beverage to the second user at a specified pickup location following the generation of the beverage.

20 Claims, 6 Drawing Sheets

Related U.S. Application Data

(60) Provisional application No. 62/027,244, filed on Jul. 22, 2014.

(51) Int. Cl.
*G06Q 10/08* (2012.01)
*G06Q 20/18* (2012.01)
*G06Q 30/06* (2012.01)

(56) References Cited

U.S. PATENT DOCUMENTS

| | | | |
|---|---|---|---|
| 5,000,345 | A | 3/1991 | Brogna et al. |
| 5,450,938 | A | 9/1995 | Rademacher |
| 5,727,609 | A | 3/1998 | Knight et al. |
| 6,053,359 | A | 4/2000 | Goulet et al. |
| 6,135,169 | A | 10/2000 | Sabdei et al. |
| 6,158,328 | A | 12/2000 | Cai |
| 6,193,154 | B1* | 2/2001 | Phillips ............ G06Q 20/385 235/381 |
| 6,497,343 | B1 | 12/2002 | Teetsel, III |
| 6,726,947 | B1 | 4/2004 | Gutwein et al. |
| 6,759,072 | B1 | 7/2004 | Gutwein et al. |
| 6,786,138 | B2 | 9/2004 | Johnson et al. |
| 7,401,613 | B2 | 7/2008 | Carhuff et al. |
| 7,469,627 | B2 | 12/2008 | Li |
| 7,487,711 | B2 | 2/2009 | Carbonini |
| 7,519,451 | B2 | 4/2009 | Hartnell et al. |
| 7,577,498 | B2 | 8/2009 | Jennings et al. |
| 7,580,859 | B2 | 8/2009 | Economy et al. |
| 7,757,896 | B2 | 7/2010 | Carpenter et al. |
| 7,899,713 | B2 | 3/2011 | Rothschild |
| 7,913,879 | B2 | 3/2011 | Carpenter et al. |
| 8,032,251 | B2 | 10/2011 | Monn |
| 8,047,125 | B2 | 11/2011 | Bazin et al. |
| 8,162,176 | B2 | 4/2012 | Rudick |
| 8,340,815 | B2 | 12/2012 | Peters et al. |
| 8,417,377 | B2 | 4/2013 | Rothschild |
| 8,434,642 | B2 | 5/2013 | Rudick |
| 8,442,674 | B2 | 5/2013 | Tilton et al. |
| 8,459,176 | B2 | 6/2013 | Nevarez et al. |
| 8,504,196 | B2 | 8/2013 | Wiles |
| 8,606,396 | B2 | 12/2013 | Claesson et al. |
| 8,626,614 | B2 | 1/2014 | Barber et al. |
| 9,155,330 | B1 | 10/2015 | Shtivelman |
| 9,721,060 | B2 | 8/2017 | Chung et al. |
| 2002/0148858 | A1* | 10/2002 | Bertone ............... A47J 31/41 222/129.4 |
| 2003/0061271 | A1 | 3/2003 | Pittarelli |
| 2003/0070555 | A1 | 4/2003 | Reyhanloo |
| 2003/0097314 | A1* | 5/2003 | Crisp, III ............ B67D 1/0021 705/28 |
| 2003/0216970 | A1 | 11/2003 | Vadjinia |
| 2003/0236706 | A1 | 12/2003 | Weiss |
| 2004/0177762 | A1 | 9/2004 | Gutwein et al. |
| 2004/0197444 | A1 | 10/2004 | Halliday et al. |
| 2004/0249502 | A1 | 12/2004 | Truong et al. |
| 2005/0034606 | A1 | 2/2005 | Albon |
| 2005/0125317 | A1 | 6/2005 | Winkelman, III et al. |
| 2006/0005712 | A1 | 1/2006 | Greenwald et al. |
| 2006/0037353 | A1 | 2/2006 | Smestad et al. |
| 2006/0080349 | A1 | 4/2006 | Thompson |
| 2006/0081653 | A1 | 4/2006 | Boland et al. |
| 2006/0149415 | A1 | 7/2006 | Richards |
| 2006/0224450 | A1 | 10/2006 | Moon |
| 2006/0260495 | A1 | 11/2006 | Siedlaczek |
| 2007/0061487 | A1 | 3/2007 | Moore et al. |
| 2007/0106422 | A1* | 5/2007 | Jennings ............... B25J 9/0084 700/245 |
| 2007/0106565 | A1 | 5/2007 | Coelho |
| 2007/0114244 | A1* | 5/2007 | Gatipon ............... B67D 1/0041 222/129.1 |
| 2007/0215239 | A1* | 9/2007 | Dorney ............... B67D 1/0888 141/94 |
| 2007/0288252 | A1 | 12/2007 | Weinberg |
| 2008/0004973 | A1* | 1/2008 | Rothschild ......... G06Q 30/0613 705/14.46 |
| 2008/0050480 | A1 | 2/2008 | Majer |
| 2008/0116262 | A1 | 5/2008 | Majer |
| 2008/0201241 | A1 | 8/2008 | Pecoraro |
| 2009/0069932 | A1 | 3/2009 | Rudick |
| 2009/0095165 | A1 | 4/2009 | Nosler et al. |
| 2009/0105875 | A1 | 4/2009 | Wiles |
| 2009/0117240 | A1 | 5/2009 | Crescenzi |
| 2009/0136632 | A1 | 5/2009 | Gutwein et al. |
| 2009/0149988 | A1 | 6/2009 | Hyde et al. |
| 2009/0157937 | A1 | 6/2009 | Kuschke et al. |
| 2009/0158937 | A1 | 6/2009 | Stearns et al. |
| 2009/0202686 | A1 | 8/2009 | Lavie et al. |
| 2009/0293733 | A1 | 12/2009 | Martin et al. |
| 2010/0024657 | A9 | 2/2010 | Nosler et al. |
| 2010/0030355 | A1 | 2/2010 | Insolia et al. |
| 2010/0034942 | A1 | 2/2010 | Illy et al. |
| 2010/0047407 | A1 | 2/2010 | Carbonini |
| 2010/0116842 | A1* | 5/2010 | Hecht ............... B67D 1/0888 222/1 |
| 2010/0125362 | A1* | 5/2010 | Canora ............... G07F 9/00 700/236 |
| 2010/0145522 | A1* | 6/2010 | Claesson ............ B67D 1/0051 700/265 |
| 2010/0198413 | A1 | 8/2010 | De'Longhi |
| 2010/0198643 | A1 | 8/2010 | Friedman et al. |
| 2010/0198726 | A1 | 8/2010 | Doran et al. |
| 2010/0203209 | A1 | 8/2010 | Fishbein et al. |
| 2010/0256826 | A1* | 10/2010 | Crisp, III ............ B67D 1/0071 700/283 |
| 2010/0268378 | A1 | 10/2010 | Sharpley |
| 2010/0272870 | A1 | 10/2010 | Hsu et al. |
| 2011/0070349 | A1 | 3/2011 | Burri et al. |
| 2011/0121032 | A1* | 5/2011 | Deo ............... G07F 13/065 222/145.1 |
| 2011/0123688 | A1* | 5/2011 | Deo ............... B67D 1/0034 426/231 |
| 2011/0298583 | A1* | 12/2011 | Libby ............... B67D 1/0041 340/5.28 |
| 2011/0315711 | A1* | 12/2011 | Hecht ............... A47J 31/52 222/129.1 |
| 2012/0156337 | A1 | 6/2012 | Studor et al. |
| 2012/0156339 | A1 | 6/2012 | Studor et al. |
| 2012/0156343 | A1 | 6/2012 | Studor et al. |
| 2012/0158173 | A1* | 6/2012 | Metropulos ......... G07F 13/065 700/236 |
| 2012/0175010 | A1* | 7/2012 | Beasley ............... B67D 1/1238 141/1 |
| 2012/0245732 | A1* | 9/2012 | Yoakim ............... A47J 31/5255 700/244 |
| 2012/0253993 | A1 | 10/2012 | Yoakim et al. |
| 2012/0285986 | A1* | 11/2012 | Irvin ............... B67D 1/0041 222/1 |
| 2013/0085600 | A1 | 4/2013 | Nicol et al. |
| 2013/0085874 | A1 | 4/2013 | Gagne et al. |
| 2013/0087050 | A1* | 4/2013 | Studor ............... A47J 31/52 99/285 |
| 2013/0140324 | A1* | 6/2013 | Deo ............... B67D 1/0888 222/1 |
| 2013/0166334 | A1* | 6/2013 | Liberty ............... G06Q 10/02 705/5 |
| 2013/0189405 | A1* | 7/2013 | Filliol ............... A47J 31/521 426/231 |
| 2013/0245819 | A1* | 9/2013 | Davenport ......... G07F 13/02 700/231 |
| 2014/0059621 | A1* | 2/2014 | Wang ............... B67D 1/0872 725/74 |
| 2014/0072679 | A1 | 3/2014 | Balassanian |
| 2014/0081777 | A1* | 3/2014 | Mastrodonato ..... G06Q 30/0621 705/15 |
| 2014/0188271 | A1* | 7/2014 | Hernandez ......... G06F 3/04817 700/232 |
| 2014/0209634 | A1* | 7/2014 | Metropulos ......... B67D 1/06 222/129.1 |
| 2014/0263413 | A1* | 9/2014 | Green ............... B67D 1/0065 222/1 |

(56) References Cited

U.S. PATENT DOCUMENTS

| | | | |
|---|---|---|---|
| 2014/0272049 A1 | 9/2014 | Azzano et al. | |
| 2014/0277703 A1 | 9/2014 | Studor et al. | |
| 2015/0027315 A1 | 1/2015 | Lüssi et al. | |
| 2015/0144653 A1* | 5/2015 | Kline | B67D 1/0888 222/1 |
| 2015/0351582 A1* | 12/2015 | Roth | B67D 1/0041 426/232 |
| 2015/0355810 A1* | 12/2015 | Abrach | G07F 13/065 222/1 |
| 2016/0027132 A1* | 1/2016 | Craparo | G07F 13/06 705/15 |
| 2016/0052770 A1* | 2/2016 | Ratti | A47J 43/27 705/15 |
| 2016/0092851 A1 | 3/2016 | De Berg Hewett | |
| 2016/0249766 A1* | 9/2016 | Studor | A47J 31/525 426/231 |
| 2018/0257919 A1* | 9/2018 | Balstad | B67D 1/0085 |

FOREIGN PATENT DOCUMENTS

| | | |
|---|---|---|
| JP | 2014502751 A | 2/2014 |
| JP | 2014522008 A | 8/2014 |
| KR | 1020100041443 A | 4/2010 |
| WO | WO2007011241 A1 | 1/2007 |
| WO | WO2010068638 A1 | 6/2010 |
| WO | WO2011116247 A2 | 9/2011 |
| WO | WO2012083194 A2 | 6/2012 |
| WO | WO2012145649 A1 | 10/2012 |
| WO | WO2013152388 A1 | 10/2013 |
| WO | WO2014025753 A1 | 2/2014 |

OTHER PUBLICATIONS

Interactive Menus, IP.com prior art database IPCOM000255134D, Sep. 14, 2018 (Year: 2018).*

Method and System for Beverage Ordering and Production Utilizing Cognitive Techniques. IP.com prior art database IPCOM000252159D, Dec. 19, 2017 (Year: 2017).*

Japanese Office Action in Japanese with English summary for JP application No. 2018-177121, dated Oct. 29, 2019, 6 pages.

International Search Report on International application No. PCT/US2015/041583, dated Oct. 19, 2015, 4 pages.

Written Opinion of the International Searching Authority on International application No. PCT/US2015/041583, dated Oct. 19, 2015, 11 pages.

* cited by examiner

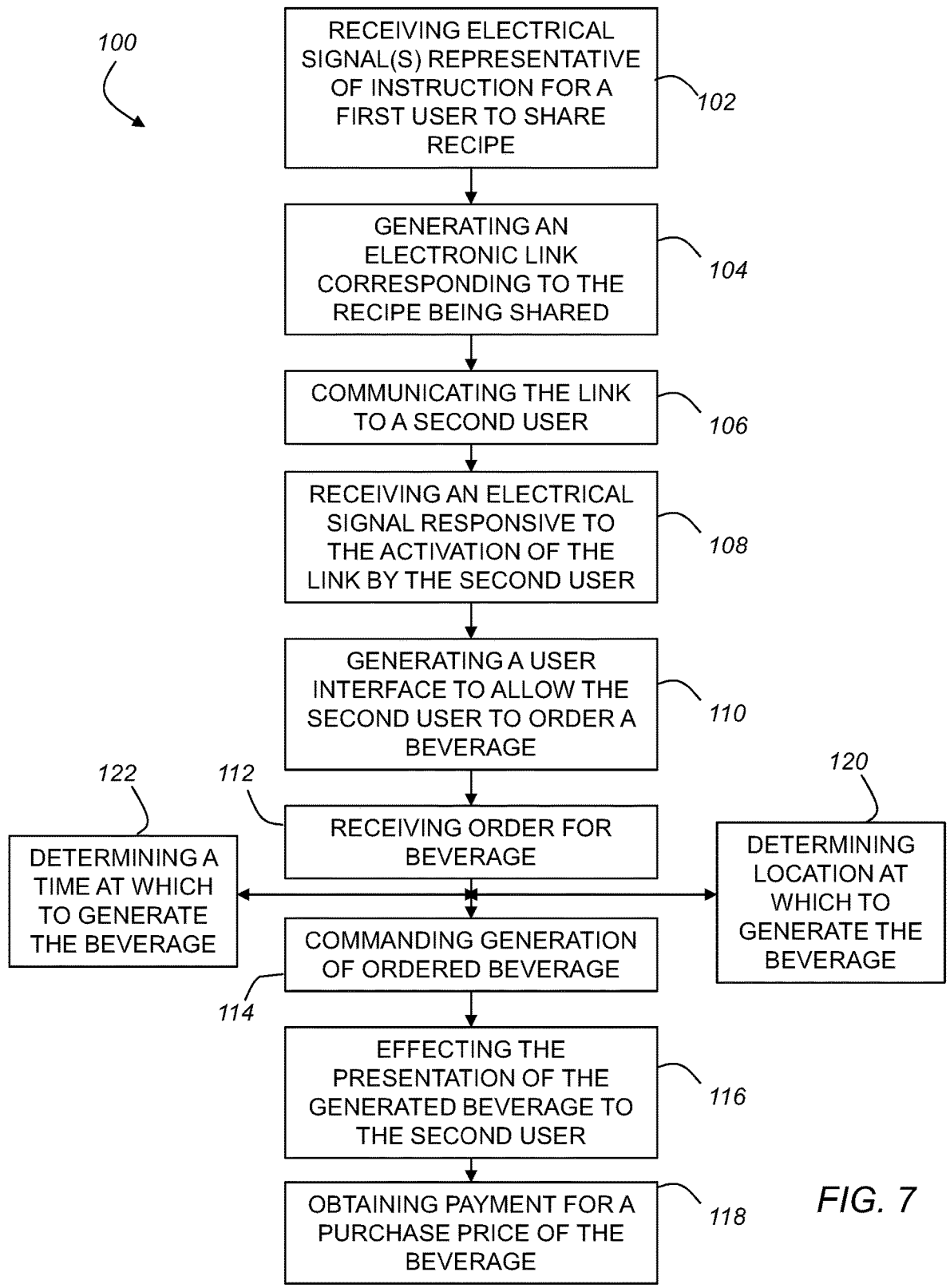

FACILITATING BEVERAGE ORDERING AND GENERATION

TECHNICAL FIELD

This disclosure relates generally to beverage systems, and more particularly, to facilitating the ordering and generation of beverages using such systems in response to a first user's sharing of a beverage recipe with a second user.

BACKGROUND

Known beverage systems, for example, automated beverage generating systems and partially or semi-automated beverage generating systems (e.g., staffed by an attendant or barista), may comprise any number of components to facilitate the ordering of a beverage by a customer, the generation or production of the ordered beverage, and ultimately the delivery of the beverage to the customer. Such systems may include or support, for example, one or more user interfaces to allow a customer design or create a customized recipe for a desired beverage, one or more components or modules configured to contribute to the generation or production of the desired beverage, and one or more delivery mechanisms to deliver the completed beverage to the customer. One drawback of these types of systems is that there is no way in which a recipe designed or created by a first user can be shared with a second user in an efficient and simple manner that allows the second user to easily review and/or modify the recipe, and/or to easily order the beverage corresponding to the recipe, or a modified version thereof.

SUMMARY

According to one embodiment, there is provided a method for facilitating the ordering and generation of a beverage. The method comprises receiving an electrical signal in response to the activation by a second user of an electronic link corresponding to a recipe for the beverage shared by a first user. The method further comprises generating a user interface having a user-selectable or user-inputtable order field for allowing the second user to place an order for the beverage. The method still further comprises receiving an order for the beverage responsive to an input made by the second user via the order field, commanding the generation of the beverage responsive to the received order, and effecting the presentation of the beverage to the second user at a specified pickup location following the generation of the beverage.

According to another embodiment, there is provided a system for facilitating the ordering and generation of a beverage. The system comprises an electronic processing unit and an electronic memory device electrically coupled to the electronic processing unit and having instructions stored therein. The processing unit is configured to access the memory device and execute the instructions stored therein such that it is configured to receive an electrical signal in response to the activation by a second user of an electronic link corresponding to a recipe for the beverage shared by a first user, generate a user interface having a user-selectable or user-inputtable order field for allowing the second user to place an order for the beverage, receive an order for the beverage responsive to an input made by the second user via the order field, and command the generation of the beverage responsive to the received order.

According to yet another embodiment there is provided a beverage generating system. The system comprises a central host and a kiosk configured for communication with the central host and including a plurality of process modules each configured to perform one or more processes contributing to the production of beverages. The central host is configured to receive an electrical signal in response to the activation by a second user of an electronic link corresponding to a recipe for the beverage shared by a first user, generate a user interface having a user-selectable or user-inputtable order field for allowing the second user to place an order for the beverage, receive an order for the beverage responsive to an input made by the second user via the order field and send one or more electrical command signals to the kiosk representative of a command generate the beverage responsive to the received order. The kiosk is configured to receive the command signal(s) from the central host, generate the ordered beverage responsive to the received command signal(s), and present the beverage to the second user following the generation of the beverage.

DESCRIPTION OF THE DRAWINGS

One or more embodiments of the invention will hereinafter be described in conjunction with the appended drawings, wherein like designations denote like elements, and wherein:

FIG. 7 is a flow diagram of an illustrative embodiment of a method for facilitating the ordering and generation of a beverage.

DETAILED DESCRIPTION OF EMBODIMENTS

The methods and systems described herein may be used to facilitate the ordering and generation or production of beverages, such as, for example and without limitation, brewed beverages (e.g., hot or cold brewed beverages). For purposes of this disclosure, the phrase "brewed beverages" or "brewed beverage" is intended to mean any consumable beverage that is made through a process in which a liquid and one or more ingredients are combined though one or more of mixing, stirring, boiling, steeping, infusion, frothing, pressurization, and/or fermentation over a prescribed period of time. Examples of brewed beverages include, but are not limited to, coffee, tea, espresso, and beer. It will be appreciated that while the description below is primarily with respect to the production of brewed beverages, the present disclosure is not meant to be so limited. Rather, the methods and systems described herein may also be used to produce other types of prepared beverages, such as, for example, hot chocolate and energy drinks, to name a few. In any event, in an illustrative embodiment, the system may be implemented as, and the methods may be performed by, for example, an automated beverage generating system, such as, for example and without limitation, that or those described in U.S. Pat. No. 8,515,574 issued on Aug. 20, 2013 and U.S.

Patent Publication No. 2013/0087050 published on Apr. 11, 2013, the contents of each of which are hereby incorporated by reference in their entireties. The systems and methods described herein may be used to, among other things, facilitate the ordering and generation of a beverage in response to the activation by a second user of an electronic link corresponding to a recipe for a beverage shared with the second user by a first user. For purposes of this disclosure, the term "recipe" is intended mean a collection of one or more parameters and/or features of a particular beverage, and may include, for example and without limitation, one or a combination of: the type(s) and amount(s) of ingredients to be used to produce the beverage; the size of the container in which the beverage is contained when presented to a customer; latte art included in the foam of a beverage (if applicable); and a temperature or temperatures of the beverage and/or various ingredients thereof, to cite only a few possibilities.

Figure 1:
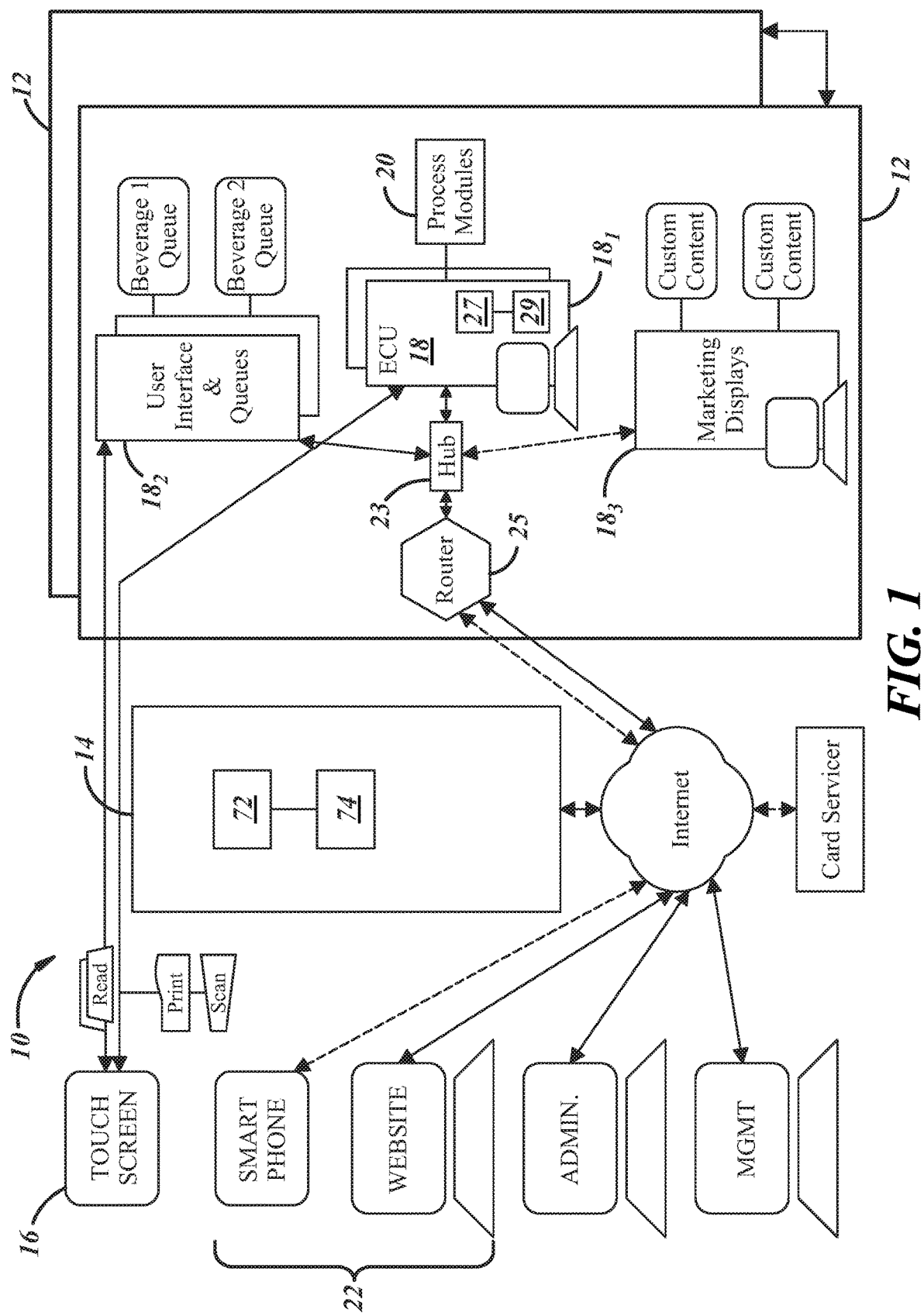
FIG. 1 is a schematic and diagrammatic view of a system for generating or producing beverages.

Referring now to the drawings wherein like reference numerals are used to identify identical or similar components in the various views, FIG. 1 depicts an illustrative embodiment of a system 10 for, among potentially other things, facilitating the ordering and generation of a beverage, such as, for example, a brewed beverage (e.g., coffee, espresso, tea, etc.). In the illustrated embodiment, system 10 comprises one or more beverage generating kiosks 12 (e.g., standalone or walkup kiosk(s)) each configured to prepare and dispense beverages, and a central host or datacenter 14 configured to communicate with the kiosk(s) 12. In an embodiment, the beverage generating system may comprise an automated beverage generating system in that a beverage may be generated and presented to a customer by the kiosk of the system without requiring involvement in the beverage generating and presentation processes on the part of a kiosk attendant. In other embodiments, the beverage generating system may comprise a partially automated or semi-automated system in that the kiosk may be staffed by an attendant who may be involved and take certain action in the beverage generating and/or presentation processes. Accordingly, the present disclosure is not intended to be limited to any particular type(s) of beverage generating systems.

As described in U.S. Pat. No. 8,515,574, which was incorporated by reference above, in an embodiment, kiosk 12 comprises a plurality of components that may allow for an automated kiosk having the functionality to, in general terms, take ground coffee or beans as an input and to produce a fully lidded brewed beverage as an output. To that end, kiosk 12 may include, among other components, one or more user interface mechanisms 16, an electronic control unit (i.e., ECU 18), and one or more process modules 20. In various embodiments, kiosk 12 may further comprise a cup handler, a lid dispenser, a completed drink presenter, a presentation area, and various actuators, sensors, and/or other components, some of which are described below.

As shown in the example illustrated in FIG. 1, kiosk 12 may include one or more user interface mechanisms 16. A user interface mechanism may include any number of devices suitable to display or provide information to a user (e.g., customer, potential customer, administrator, service technician, etc.) and/or to receive information from a user. Accordingly, user interface mechanism(s) 16 may comprise, for example, one or more of: a liquid crystal display (LCD); a touch screen LCD (e.g., a 15-inch touch screen LCD); a cathode ray tube (CRT); a plasma display; a keypad; a keyboard; a computer mouse or roller ball; a joystick; one or more switches or buttons; a user interface (e.g., a graphic user interface (GUI) and/or a text-based user interface; or any other display or monitor device. User interface mechanism(s) 16 may further include one or more of: a card reader (e.g., for credit, debit, loyalty, gift, and other like cards); a radio frequency identification (RFID) reader; a coin acceptor; a printer; a loyalty or gift card dispenser; a microphone; and/or a speaker. In an illustrative embodiment, one or more user interface mechanisms 16 of kiosk 12 are disposed at the same location as the kiosk and may be disposed either within the outer housing thereof, or in close proximity thereto, such that it may be accessed by customers. Accordingly, and as will be described more fully below, user interface mechanism(s) 16 provide(s) an interface between kiosk 12 and a user and may be configured to permit either one-way or two-way communication therebetween.

In addition to or instead of kiosk 12 including one or more user interface mechanisms 16, system 10 may include one or more user interfaces 22 that are separate and distinct from kiosk 12, but that nonetheless provide a direct or indirect interface between a user and one or more kiosks 12 of system 10. User interface(s) 22 may be configured to facilitate one- or two-way communication between a user and one or more kiosks 12 and/or central host 14. For example, and as will be described in greater detail below, one or more components of system 10 (e.g., ECU 18 of kiosk 12, central host 14, etc.) or some other component (e.g., a software application or "app") may be configured to generate a user interface 22 in the form of a graphical or text-based interface (e.g., having one or more user-selectable or user-inputtable fields or links) that may be displayed on a suitable device (e.g., smart phone, tablet, computer, PDA, etc.) that may not itself be part of system 10, but that allows a user to interact or communicate directly with kiosk 12 or central host 14, or indirectly with kiosk 12 through, for example, central host 14. It will be appreciated that in an embodiment wherein the graphical or text-based user interface is communicated to a suitable user device, such communication may be supported or facilitated by any number of well known communication techniques and protocols, such as, for example, one or more of those described below.

Figure 2:
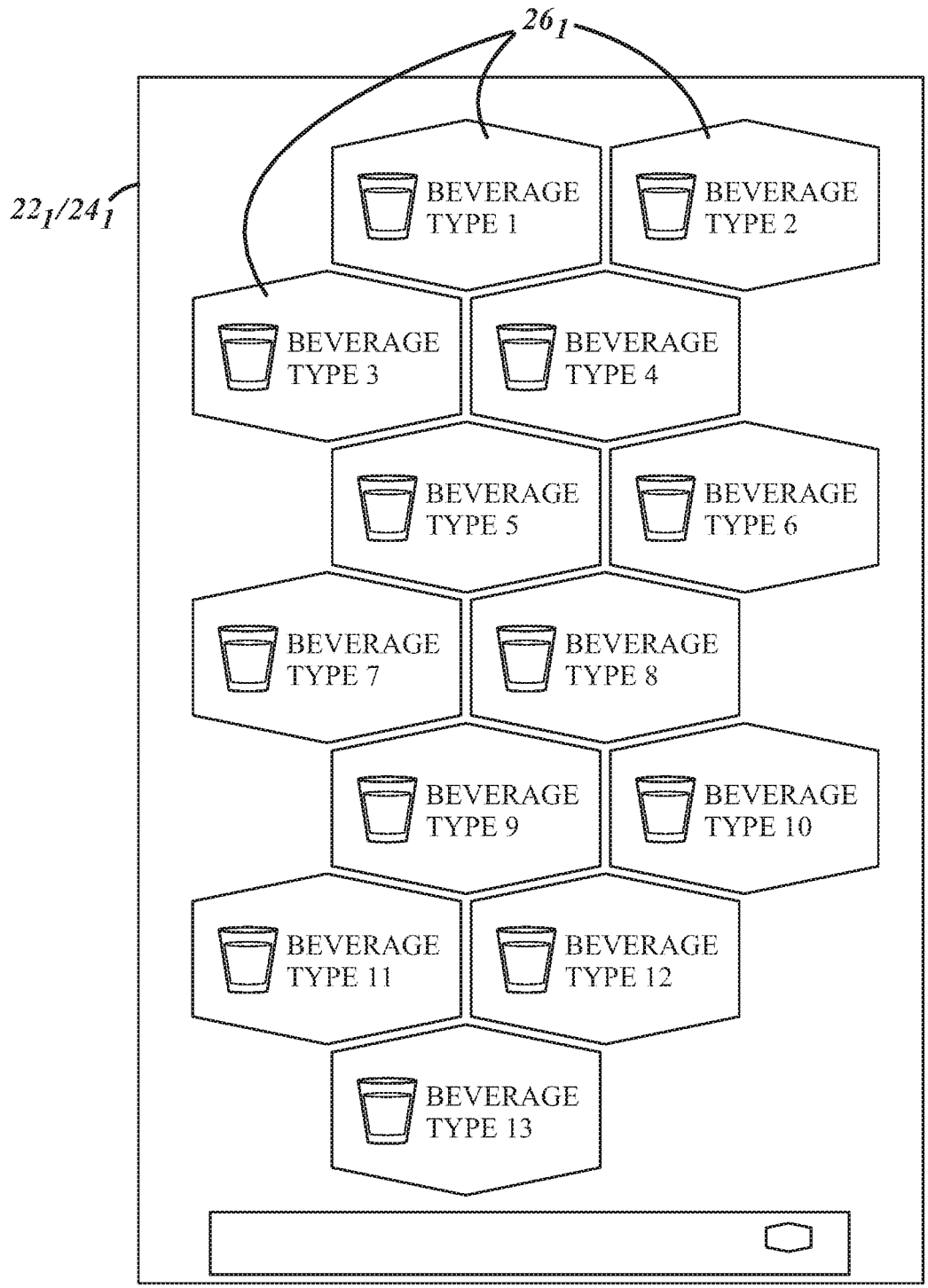
FIGS. 2 and 3 illustrate illustrative embodiments of graphical user interfaces (GUIs) that may be used to order beverages and/or share/gift beverage recipes.
Figure 3:
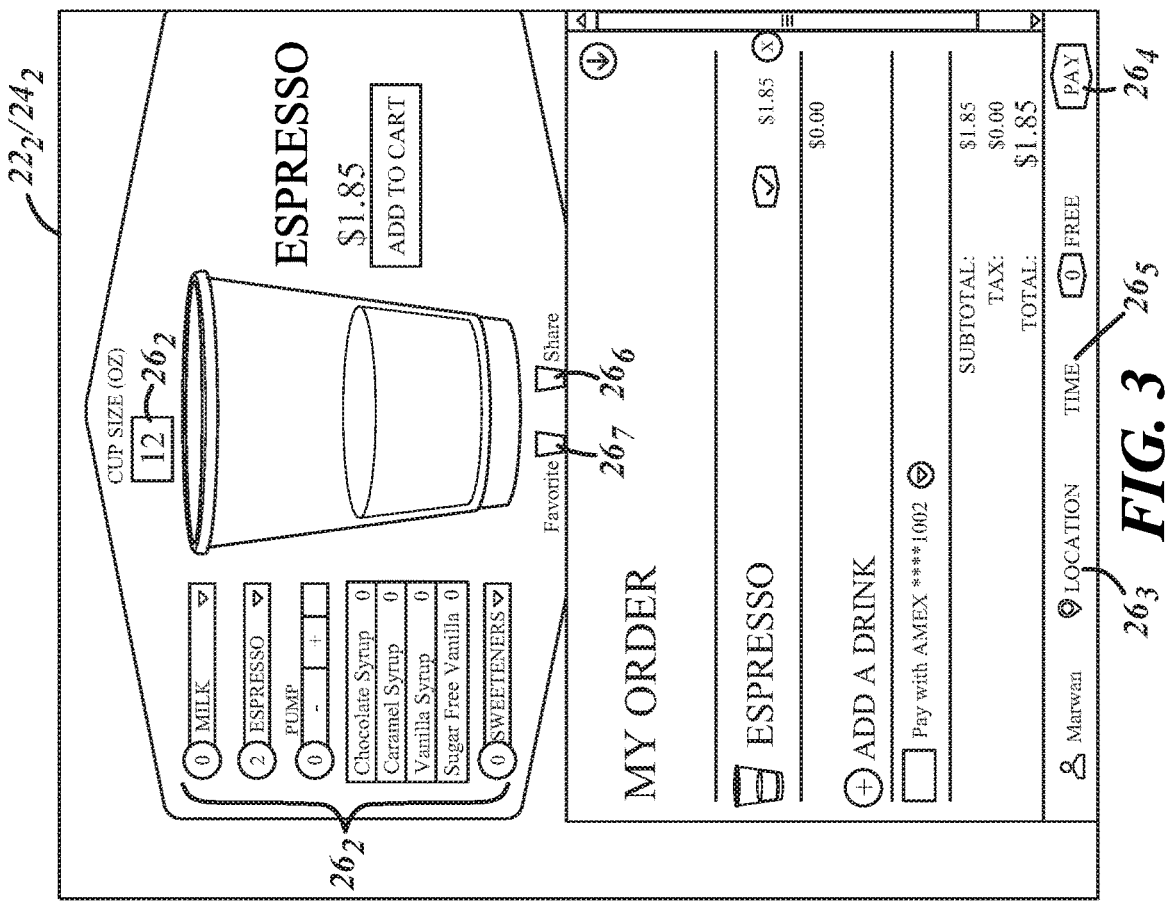

As was briefly described above, in an illustrative embodiment, one or more user interface mechanism(s) 16 of kiosk 12 and/or one or more user interfaces 22 of system 10 may be configured to facilitate two-way communication between a user and the system 10 (e.g., kiosk 12 and/or central host 14). More particularly, one or more of user interface mechanism(s) 16 and/or one or more user interface(s) 22 (collectively "user interfaces 16, 22") may comprise an interactive interface that allows a user to interact with, for example, kiosk 12 and/or central host 14. For instance, one or more of user interfaces 16, 22 may be configured to display a message prompting a user to input certain information (e.g., the selection of a function, operation, or customization to be performed; the selection of a beverage to be produced; user identifying information; etc.), and to also provide a means by which such information may be inputted (e.g., user-selectable or user-inputtable fields or links). By way of example, FIGS. 2 and 3 depict embodiments of user interfaces $24_1$, $24_2$ that in the illustrated embodiments comprise GUIs. Each of interfaces $24_1$, $24_2$ may comprise or be displayed on user interface mechanism 16 of kiosk 12 or may comprise one of user interface(s) 22 of system 10. User interfaces $24_1$, $24_2$ each include a number of user-inputtable or user-selectable fields, for example, one or a combination of: beverage-type selection field(s) $26_1$ to allow the user to select a type of beverage (e.g., latte, mocha, hot chocolate, cappuccino, etc.); one or more recipe definition/modification fields $26_2$ to allow a user to define or modify a recipe for a beverage; a location selection field 26₃ to allow the user to select a kiosk location at which an ordered beverage is to be generated; an order placement field 26₄ (e.g., the "pay" field); and a time entry field 26₅ to allow the user to select a time at which to generate or to pick up an ordered beverage, to cite only a few possibilities.

In any event, inputs provided by one or more of a user via user interface(s) 16, 22 may be communicated to, for example, a component of kiosk 12 (e.g., ECU 18) or to central host 14, which may then take certain action in response to the received input. In an embodiment, the communication between user interface(s) 16, 22 and an intended component of system 10 may be direct communication (i.e., electrical signals flow from the user interface directly to the intended component (e.g., a component of kiosk 12, central host 14, etc.)). In other embodiments, however, the communication may be indirect such that the input received at the user interface may be routed and relayed from the user interface, to one or more other components of kiosk 12 or system 10, and then to the intended recipient. For example, an input received at a user interface may be routed from the user interface to central host 14, which may then relay the input to kiosk 12. Similarly, in another example, the input received at a user interface may be communicated from the user interface to a controller or ECU associated therewith, which may then relay the input to an intended recipient such as, for example, ECU 18 of kiosk 12 or central host 14. In yet another example, the input received at a user interface may be routed through, for example, one or more intermediary components of kiosk 12, such as, for example, a hub (e.g., hub 23 in FIG. 1), a router (e.g., router 25 in FIG. 1), a modem, etc., prior to the input reaching the intended recipient. Accordingly, it will be appreciated that a user input received at a user interface may be communicated to the intended component(s) of system 10 in any number of ways, each of which remains within the spirit and scope of the present disclosure. It will be further appreciated that whether the communication described above is one- or two-way, such communication may be supported or facilitated by any number of well known communication techniques and protocols, such as, for example, one or more of those described below.

Accordingly, in view of the above, it will be appreciated that user interface(s) 16, 22 may be configured to serve a number of purposes and to perform a number of functions, all of which remain within the spirit and scope of the present disclosure. It will be further appreciated by those of ordinary skill in the art that user interface mechanism(s) 16 and user interface(s) 22 may be configured to perform some or all of the same functionality. Accordingly, while certain functionality may described herein as being performed only by or through user interface mechanism(s) 16 or user interface(s) 22, the present disclosure is not intended to be so limited, but rather in various embodiments, and as appropriate, some or all of the functionality may be performed by either user interface mechanism(s) 16 or user interface(s) 22.

In the embodiment illustrated in FIG. 1, kiosk 12 includes an ECU 18 that may be disposed within an outer housing or enclosure of kiosk 12, or alternatively, outside of such an enclosure but in close proximity thereto. In an embodiment, ECU 18 comprises a processing unit 27 and one or more memory or other storage devices 29. In other embodiments, rather than or in addition to the ECU 18 comprising a memory device, kiosk 12 may include one or more memory devices that are separate and distinct from the ECU 18 but accessible thereby. Processing unit 27 of ECU 18 may include any type of suitable electronic processor (e.g., a programmable microprocessor or microcontroller, an application specific integrated circuit (ASIC), etc.) that is configured to execute appropriate programming instructions for software, firmware, programs, algorithms, scripts, etc., to perform various functions, such as, for example and without limitation, those described herein.

Memory device 29, whether part of ECU 18 or separate and distinct therefrom, may include any type of suitable electronic memory means and may store a variety of data and information. This includes, for example: software, firmware, programs, algorithms, scripts, and other electronic instructions that, for example, are required to perform or cause to be performed one or more of the functions described elsewhere herein (e.g., that are used by ECU 18 to perform various functions described herein); customer-specific data and information; various data structures; operating parameters and characteristics of the kiosk and the components thereof; information (e.g., parameters, characteristics, etc.) relating to ingredients used in or by kiosk 12; beverage recipes; beverage production queues; etc. In some embodiments, rather than all of the aforementioned information/data being stored in a single memory device, in an embodiment, multiple suitable memory devices may be provided. In any event, in at least some embodiments, some or all of the aforementioned instructions, information, etc. may be provided as a computer program product, or software, that may comprise or include a non-transitory, computer-readable storage medium. This storage medium may have instructions stored thereon, which may be used to program a computer system (or other electronic devices, for example, the ECU 18) to implement the control of some or all of the functionality described herein, including, in at least some implementations or embodiments, one or more steps of the methodology described below. A computer-readable storage medium may include any mechanism for storing information in a form (e.g., software, processing application) readable by a machine (e.g., a computer, processing unit, etc.). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical, or other types of medium suitable for storing program instructions. In addition, program instructions may be communicated using optical, acoustical, or other form of propagated signal (e.g., carrier waves, infrared signals, digital signals, or other types of signals or mediums).

As will be described below, ECU 18 may be electronically connected to other components of kiosk 12 via I/O devices and suitable connections, such as, for example, a communications bus or a wireless link, so that they may interact as required. It will be appreciated, however, that the present disclosure is not meant to be limited to any one type of electronic connection, but rather any connection that permits communication between ECU 18 and other components of kiosk 12 may be utilized.

ECU 18 may be configured to perform, or may be configured to cause/command to be performed, some or all of the functionality of kiosk 12, including, for example, some or all of those functions and features described herein (e.g., some or all of the functionality of the method described below). For example, and with reference to the illustrated embodiment depicted in FIG. 4, ECU 18 may coordinate all user interface mechanisms 16, machine controls, sensors, and feedback (e.g., control and feedback illustrated at 28, 30, 32, 34, and 36 in FIG. 2), as well as communication to central host 14 and/or one or more other components or devices of system 10 (e.g., other kiosks 12 in system 10), if applicable. For example, some or all of the valves, heaters, pumps, servo motors, flow control mechanisms, and/or other mechanical components of process modules 20 described below may be controlled by ECU 18. Accordingly, in an embodiment, ECU 18 may be configured to receive a request for the production of a beverage from a user interface mechanism 16 of kiosk 12 (or from either a user interface 22 of system 10 or central host 14), and to then effect the production of the specified beverage by controlling (directly or indirectly) the operation of process modules 20 and other components required to produce the specified beverage. In an embodiment, ECU 18 may be further configured to exert at least a measure of control over one or more user interface mechanisms 16 (and/or user interfaces 22, in certain embodiments) to cause, for example, messages to be displayed thereon notifying a customer, among possibly other things, that the production of the beverage they requested has been completed and that it is ready to be picked-up.

In addition, and as will be described below, ECU 18 may also be configured to interact with central host 14 for any number of purposes. More particularly, in an embodiment, ECU 18 provides a gateway through which central host 14 may monitor or observe the status of any or all components of kiosk 12, and/or to exert control over one or more components of kiosk 12. For example, in addition to controlling one or more servos, actuators, valves, process modules, various sensors, and/or other components of kiosk 12, ECU 18 may also be configured to receive and analyze data collected by components of kiosk 12 (e.g., sensors) to determine, for example, the state of kiosk 12 or one or more of its constituent components, information relating operational and/or environmental parameters, raw material volumes on hand, age and types of raw materials, current activity, etc. Additionally, ECU 18 may be further configured to create and manage a beverage production queue for kiosk 12 and to share that queue with central host 14. In either instance, this data/information may be periodically (or on demand) uploaded by the ECU 18 to a local memory device of kiosk 12 that is part of or accessible by ECU 18 (e.g., memory device 29), and/or to central host 14. The central host 14 may then present the data/information from the kiosk (as well as data/information from other kiosks, in certain embodiments) to, for example, users of system 10 (e.g., customers, administrators, etc.), and/or store it a database thereof. Additionally, in an embodiment, ECU 18 may be configured to determine that certain operational or environmental conditions exist, and to then provide one or more alerts to central host 14 and/or another kiosk 12 indicating the existence of such condition(s). As will be described below, ECU 18 may also be configured to receive instructions from central host 14 to perform or cause to be performed certain functionality (e.g., central host 14 may receive an order for a beverage and ECU 18 may receive commands from the central host to generate that beverage), and to then carry out those instructions.

In various embodiments, ECU 18 may be further configured to perform functionality in addition to that described above. For example, ECU 18 may be configured to determine, using techniques well known in the art, whether communication between kiosk 12 and central host 14 has been comprised (e.g., the communication link or network over which kiosk 12 and central host 14 communicate has "gone down" or is unacceptably slow, the central host 14 is not operating properly, etc.); validating, for example, credit cards and gift cards through interaction with a database or other data structure associated with central host 14; and the like.

To facilitate the interaction and communication between ECU 18 and other components of system 10 such as central host 14, ECU 18 may comprise one or more network or communication interfaces 38 that may include or be electronically connected to, and configured for communication with, other infrastructure of kiosk 12 (e.g., known components/devices such as, for example, routers, modems, antennas, electrical ports, transceivers, etc.) configured to facilitate and support one or more types of communication networks or techniques/protocols, such as, for example, those described elsewhere below. Network interface(s) 38 allows for the exchange of data/information between ECU 18 and one or more other components of system 10.

Figure 4:
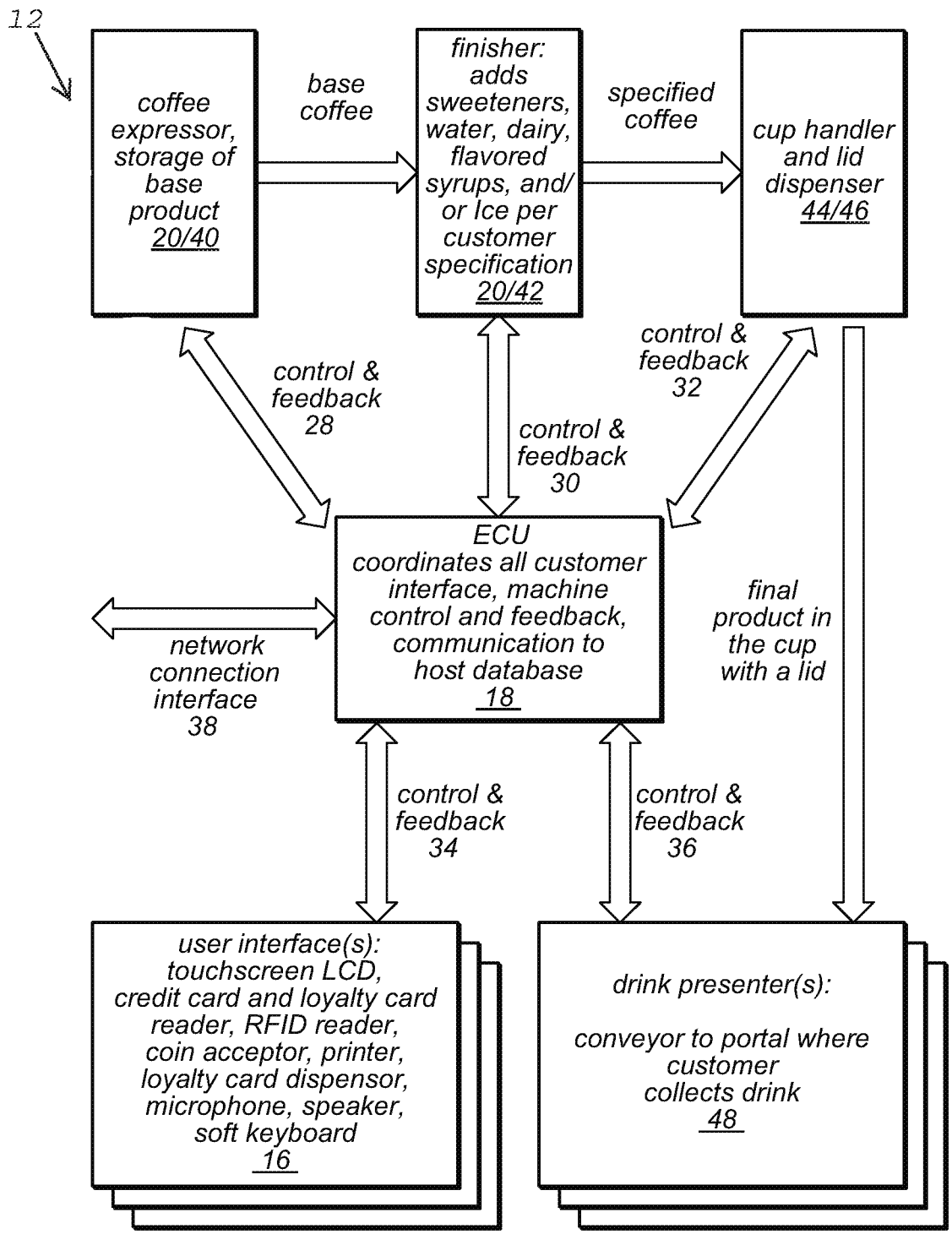
FIG. 4 is a diagrammatic view of an illustrative embodiment of a beverage generating kiosk that may be used in the system illustrated in FIG. 1.

It will be appreciated by those having ordinary skill in the art that while ECU 18 is illustrated in FIG. 4 as a single component, in some embodiments, the functionality of ECU 18 may be performed or caused to be performed by more than one ECU or other like component. For example, in an illustrative embodiment, kiosk 12 may comprise a plurality of ECUs, each one of which is configured to perform or cause to be performed different functionality. For example, and as illustrated in FIG. 1, a first ECU (i.e., ECU 181) may be configured to control process modules 20 (i.e., to form a beverage production subsystem, for example), while a second ECU (i.e., ECU 182) may be configured to control user interface mechanisms 16 (i.e., to form a user interface subsystem, for example), and a third ECU (i.e., ECU 183) may be configured to control various marketing and/or other administrative functions (i.e., to form a marketing/administrative subsystem, for example). In such an embodiment, the various ECUs may be electronically connected to each other to allow for communication therebetween, and each may be configured to also communicate with other components of system 10, such as, for example central host 14, through, for example, dedicated network interfaces or other components thereof, or common network interface(s) of kiosk 12. In another embodiment, kiosk 12 may include a number of ECUs configured to control different functionality of kiosk 12, but also includes a "master" ECU that is configured to manage and control the operation of the individual dedicated ECUs so as to have a coordinated, multi-tiered control scheme for kiosk 12. In such an embodiment, the master ECU may be the sole ECU that is configured to interface with other components of system 10; alternatively, the individual dedicated ECUs may also be configured to interface with one or more other components of system 10 directly.

While it will be apparent in view of the foregoing that any number of suitable control schemes or arrangements employing one or multiple ECUs or other suitable control/processing devices may be used to carry out the functionality of kiosk 12 and the various components thereof, in particular, for purposes of illustration and clarity, the description below will be primarily with respect to an embodiment wherein kiosk 12 includes a single ECU (i.e., ECU 18) for controlling most, if not all, of the functionality of kiosk 12 and the components thereof. It will be appreciated by those having ordinary skill in the art, however, that the present disclosure is not meant to be limited to such an embodiment, but rather, in view of the above, any number of suitable control schemes and arrangements may be used and such other schemes and arrangements remain within the spirit and scope of the present disclosure.

In addition to the components described thus far above, kiosk 12 further comprises one or more process modules 20. Each process module 20 is configured to perform one or more chemical or mechanical processes required for producing beverages. In an illustrative embodiment, each process module 20 is configured to perform one or more different mechanical and/or chemical processes than that or those performed by the other process modules. Alternatively, two or more process modules 20 may be configured to perform the same mechanical and or chemical process(es) so as to add a measure of redundancy and flexibility to kiosk 12 in case one such process module fails or is otherwise inoperable, or there is a high demand for the process(es) performed by those process modules 20.

Process modules 20 may take any number of forms. For example, and as illustrated in FIG. 4, one type of process module is an expressor unit 40 that is configured, for example, to brew coffee. Another type of process module is a finisher unit 42 that is configured, for example, to dispense one or more additives required for various beverages (e.g., flavored syrup, dairy (e.g., cold or steamed milk), ice, sweeteners, water, etc.). Accordingly, in an embodiment, kiosk 12 includes an array of process modules 20 that are configured to perform a variety of beverage production-related processes.

Each process module 20 may comprise one or more components or devices for performing the chemical and/or mechanical processes that the process module 20 is configured to perform. For instance, expressor unit 40 may comprise a number of components or devices, such as, for example, a grinder unit (configured to grind coffee beans), a tamper unit (configured to form the coffee grounds from the grinder unit into a "puck"), and a brew tube (configured to brew coffee using the puck created by the tamper unit). Accordingly, in an embodiment, one or more process modules 20 may include a combination of components or devices each of which is configured to perform a different function. Alternatively, one or more process modules 20 may be configured to perform only one process, and therefore, may comprise a single component or device (e.g., only one of a grinder unit, tamper unit, brew tube, etc.). Accordingly, embodiments wherein a given process module 20 is configured to perform a single or multiple processes remain within the spirit and scope of the present disclosure.

As was briefly described above, in an embodiment, the operation of each process module 20 is controlled by ECU 18. Accordingly, in such an embodiment, each process module 20 is electronically connected to and configured for communication with ECU 18. It will be appreciated as described above, however, that in other embodiments, one or more process modules 20, or one or more constituent components thereof, may be alternatively controlled by dedicated ECUs that are under the control of ECU 18, or by other ECUs of kiosk 12 or system 10, such as, for example, by central host 14.

In an illustrative embodiment, such as that illustrated in FIG. 4, kiosk 12 may further comprise additional components such as, for example, a cup handler 44 and a lid dispenser 46. In one embodiment, these two components may be combined into a single apparatus, while in other embodiments they may be separate and distinct from each other. In an embodiment, cup handler 44, as the name suggests, is configured to handle or control a cup into which a specified beverage being produced by kiosk 12 is ultimately dispensed. Cup handler 44 may comprise one or more actuators (e.g., XYZ actuators) configured to move or manipulate the position of a cup into which a specified beverage is to be dispensed among locations within kiosk 12 during the production of the specified beverage. In various embodiments, these locations may include, for example: a location where empty cups are stored; a location where the beverage is dispensed into the cup (e.g., a location where a mixing chamber is disposed); locations corresponding to various process modules 20 at which different ingredients or components of the beverage may be added or dispensed into the cup; locations where partially completed and/or completed beverages are temporarily stored; a location corresponding to lid dispenser 46; and a location where a beverage presenter component of kiosk 12 is disposed. In an embodiment, the operation of the cup handler 44 is controlled by ECU 18.

In an embodiment wherein kiosk 12 includes a lid dispenser, lid dispenser 46, as the name suggests, is configured to dispense lids for placement on cups containing completed or partially completed beverages. As with cup handler 44, lid dispenser 46 may comprise one or more actuators (e.g., XYZ actuators) configured to acquire a lid and to place it on the top of a cup. Accordingly, in an illustrative embodiment, when it is determined that a lid should be placed on a particular cup, lid dispenser 46 is configured to acquire a lid from a lid storage area in kiosk 12, and to then place the lid onto the cup. As with cup handler 44, in an embodiment, the operation of lid dispenser 46 may be controlled by ECU 18.

With continued reference to FIG. 4, in an illustrative embodiment, kiosk 12 further comprises one or more beverage presenters 48. Beverage presenter(s) 48 serve to transfer a completed beverage to an area at which customers may retrieve the beverages they ordered. In an embodiment, beverage presenter 48 may include, for example, a conveyor or carrousel upon which cup handler 44 places a completed beverage and that moves or delivers the beverage to, for example, a customer-accessible presentation or final product collection area 50 (illustrated in FIG. 5) where the beverage may be retrieved by the customer. This presentation area may comprise, for example, an area behind a door or window that is accessible upon the door or window opening. More particularly when a beverage is ready for retrieval by the corresponding customer, it is placed into the presentation area. When the kiosk 12 recognizes that the customer has arrived or is in vicinity of the kiosk 12 (e.g., through an input to a user interface mechanism 16 of kiosk 12), the door or window to the presentation area may be opened so that the customer may access the presentation area and retrieve his/her beverage. In various embodiments, kiosk 12 may include one or more presentation areas that may be utilized to present beverages ordered in different ways (e.g., one presentation area for beverages ordered directly at kiosk 12 for immediate delivery, and another presentation for pre-ordered beverages that are ordered in advance of a desired pickup time). As with other components described above, in an embodiment, the operation of presenter 48 and/or presentation or final product collection area may be controlled by ECU 18.

Figure 5:
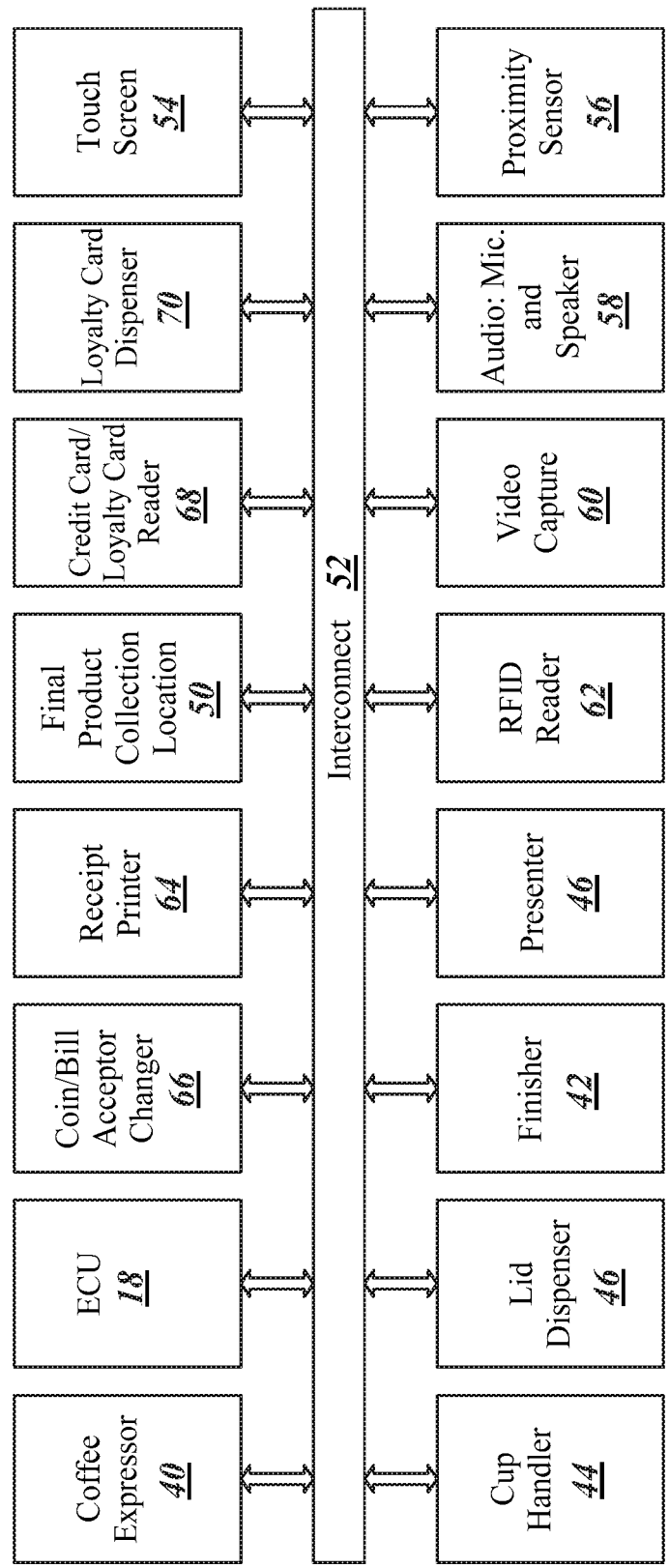
FIG. 5 is a diagrammatic and schematic view of an illustrative embodiment of an interconnection of various components of the kiosk illustrated in FIG. 2.

In view of the foregoing, it will be apparent that some or all of the components of kiosk 12 are interconnected to allow for communication and exchange of information therebetween. To that end, FIG. 5 illustrates various interconnected components of an illustrative embodiment of kiosk 12. In this example, all of the illustrated components are connected to a central interconnect 52 (e.g., a communication bus), or alternatively, one or more components may be electronically connected (e.g., by one or more wires or cables, or wirelessly) to one or more other components. In the illustrated embodiment, it is through interconnect 52 that ECU 18 may receive feedback and other inputs from the other components of kiosk 12 (e.g., process modules 20, cup handler 44, lid dispenser 46, presenter 48, etc.) and may issue commands (e.g., in the form of machine instructions or signal values) to those components. In various embodiments, one or more of user interface mechanisms 16, such as, for example, a touch screen 54, proximity sensor 56, audio interface 58 (including a microphone and/or speaker), video capture device 60, RFID reader 62, receipt printer 64, coin/bill acceptor/changer 66, credit card/loyalty card reader 68, and/or loyalty card dispenser 70, may provide a customer interface and/or maintenance interface, as controlled by ECU 18.

It will be appreciated that while certain components of kiosk 12 have been specifically identified and described above, kiosk 12 may include additional components, such as, for example, those that are described herein below. Conversely, it will be further appreciated that in certain embodiments, one or more of those components specifically identified above may not be included in kiosk 12. Accordingly, the present disclosure is not meant to be limited to any particular arrangement(s) of kiosk 12. As described above, the system 10 may further include a central host. As illustrated in FIG. 1, and as will be appreciated by those having ordinary skill in the art, central host 14 may be implemented with a combination of hardware, software, and/or middleware, and may utilize a cloud computing architecture. In an embodiment, central host 14 comprises a processing unit 72 and one or more memory or other storage devices 74. As with processing unit 27 of ECU 18, processing unit 72 may include any type of suitable electronic processor (e.g., a programmable microprocessor or microcontroller, an application specific integrated circuit (ASIC), etc.) that is configured to execute appropriate programming instructions for software, firmware, programs, algorithms, scripts, etc., to perform various functions, such as, for example and without limitation, those described herein (e.g., including some or all of the functionality of the method described below).

As with memory device 29 of ECU 18, memory device 74 may include any type of suitable electronic memory means and may store a variety of data and information. This includes, for example: software, firmware, programs, algorithms, scripts, and other electronic instructions that, for example, are required to perform or cause to be performed one or more of the functions described elsewhere herein (e.g., that are used by processing unit 72, for example, to perform various functions of central host 14 described herein); customer-specific data and information; various data structures; operating parameters and characteristics of the kiosks or other components of system 10; beverage recipes; beverage production queues; etc. In some embodiments, rather than all of the aforementioned information/data being stored in a single memory device, in an embodiment, multiple suitable memory devices may be provided. In any event, and as described above with respect to kiosk 12, in at least some embodiments, some or all of the aforementioned instructions, information, etc. may be provided as a computer program product, or software, that may comprise or include a non-transitory, computer-readable storage medium. This storage medium may have instructions stored thereon, which may be used to program a computer system (or other electronic devices, for example, the processing unit 72 of central host 14) to implement the control of some or all of the functionality described herein, including, in at least some implementations or embodiments, one or more steps of the methodology described below. A computer-readable storage medium may include any mechanism for storing information in a form (e.g., software, processing application) readable by a machine (e.g., a computer, processing unit, etc.). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical, or other types of medium suitable for storing program instructions. In addition, program instructions may be communicated using optical, acoustical, or other form of propagated signal (e.g., carrier waves, infrared signals, digital signals, or other types of signals or mediums).

In an embodiment, central host 14 comprises a host server including one or more databases stored in, for example, memory device 74. The central host 14 may further include one or more network or communication interfaces that may include or be electronically connected to, and configured for communication with, certain communication-supporting infrastructure (e.g., one or more known components/devices, such as, for example, routers, modems, antennas, electrical ports, transceivers, etc.) and be configured to communicate with various components of system 10, including, for example, kiosk 12 and software applications (commonly known as "apps") executed on various types of user devices (e.g., computers, smart phones, tablets, etc.), via a public or private network (e.g., the internet) or using other suitable communication techniques or protocols, such as, for example, those described below. In an illustrative embodiment, central host 14 is located remotely from kiosk 12 (e.g., anywhere from a few feet to any number of miles from kiosk 12). Alternatively, central host 14 may be disposed within the housing of a kiosk 12.

Central host 14 may be configured to perform or cause to be performed any number of functions and to serve any number of purposes, including, for example and without limitation, those described below (e.g., central host 14, and processing unit 72 thereof in particular, may be configured to perform some or all of the functionality of the method described below). For example, central host 14 may store and, in certain instances manage, a variety of information, such as customer-specific information and/or data, and process or operational-related information for one or more kiosks 12 (e.g., beverage recipes, production queues, empirically-derived profiles to be used in beverage production, component performance information, etc.). As was briefly described above, the central host 14 may be further configured to monitor and manage the operation of one or more kiosks 12 and/or to provide other functionality for efficiently operating one or more kiosks 12.

As was also described above, central host 14 may be further configured to send requests to one or more kiosks 12 to acquire various operational information therefrom (e.g., information relating to inventory, sales information, performance data, environmental information, customer-specific information, etc.), to receive responses containing the requested information, and to then store the requested information in one or more databases thereof. The central host 14 may be further configured to respond to requests or inquiries from kiosks 12. For instance, kiosk 12 may send a request to central host 14 for updates to operational information stored locally at kiosk 12 or for a recipe for a particular beverage, and central host 14 may respond with the requested information. Additionally, in an embodiment, both central host 14 and kiosk 12 may be configured to send inquiries to the other (and to receive and respond to inquiries sent by the other, as appropriate) to determine whether or not it and/or the other component are functioning properly, and/or whether there is a problem with the communication link or network over which they communicate.

In addition to the above, the central host 14 may be further configured to send instructions or commands to kiosk 12, and ECU 18 thereof, in particular, instructing it to perform certain tasks, such as, for example, to commence production of a particular beverage, to shut down operation of one or more components, to display certain messages or content on a user interface mechanism 16 of kiosk 12, to name a few. Accordingly, it will be appreciated that in various embodiments, central host 14 may be configured to exert a measure of control over some or all of the features and functionality of kiosk 12.

As was briefly described above, central host 14 may also serve as an interface to system 10, and kiosk(s) 12 thereof, in particular, for customers wishing to place beverage orders remotely from kiosks 12 (e.g., via an internet web browser, smart phone application, etc.). Accordingly, in an embodiment, central host 14 may be configured to receive requests to produce one or more beverages placed through, for example, GUIs or text-based user interfaces displayed on various customer devices. For example, the central host 14 may be configured to generate or interface with GUIs or text-based interfaces having user-selectable or user-inputtable fields or links that allow for the ordering and, in certain embodiments, customization of beverages. These orders may then be communicated from central host 14 to kiosk 12, and, in certain embodiments, ECU 18 thereof in particular.

In an embodiment wherein system 10 comprises a plurality of kiosks 12, central host 14 may be further configured to determine which kiosk 12 is best equipped produce the customer's requested beverage. This determination may be based on, for example, the ability of kiosks 12 to produce the requested beverage (e.g., in view of the availability of ingredients for the specified beverage, the operation state of the kiosk, etc.), the location of the customer relative to one or more kiosks, and/or other parameters or factors, such as, for example, current traffic conditions that may be acquired or obtained by central host 14. In such an embodiment, central host 14 may be further configured to either advise a customer which kiosk to go to, to suggest a particular kiosk, or to present the customer with a number of options from which the customer may select a location at which to have a beverage generated.

It will be further appreciated that, as illustrated in FIG. 1, in an illustrative embodiment wherein the central host 14 is located remotely from where a system administrator or operator is located, the administrator or operator may be configured to interface and interact with the central host 14, or individual kiosks 12 through central host 14, using the same communication techniques and protocols used to support the communication between central host 14 and kiosk(s) 12, between users and central host 14 or kiosks 12, and/or, as will be described below, between individual kiosks. Accordingly, system 10 is configured to allow a system administrator or operator to easily monitor and access information relating to system 10 and the constituent components thereof.

While a number of functions performed or served by the central host 14 have been specifically identified, the description above is not intended to be an exhaustive list of the functionality of central host 14. Rather, those having ordinary skill in the art will understand and appreciate that central host 14 may be configured to perform any number of additional functions, such as, for example, those described elsewhere herein below, or to perform less than all of those functions described herein. Accordingly, central hosts configured to perform more or less functions than those described herein remain within the spirit and scope of the present disclosure.

As briefly described above, and as will be described in greater detail below, system 10 may comprise two or more kiosks 12 that are configured to communicate both with central host 14, as was described above, as well as one or more other kiosks 12. Accordingly, in an illustrative embodiment, the system 10 comprises a plurality of distributed kiosks 12 networked together to generally allow for, among other things, communication and exchange information between each other, as well as between the kiosks 12 and central host 14. In such an embodiment, each kiosk 12 may be configured both structurally and operationally in the same manner as that described above and below, or one or more kiosks may vary in structure and/or operation.

As described above, various components of system 10 may be configured to communicate with each other and, in at least some embodiments, with components not part of system 10 but operative to be used in conjunction with system 10. This communication may be facilitated in one or more ways over one or more suitable wired or wireless networks, such as, for example and without limitation, a suitable Ethernet network; via radio and telecommunications/telephony networks (e.g., cellular networks, analog voice networks, or digital fiber communications networks); via storage area networks such as Fibre Channel SANs; or via any other suitable type of network and/or protocol (e.g., local area networks (LANs); wireless local area networks (WLANs); broadband wireless access (BWA) networks; personal Area Networks (PANs) such as, for example, Bluetooth; etc.). The network or communication interfaces of the various components may use standard communications technologies and protocols, and may utilize links using technologies such as, for example, Ethernet, IEEE 802.11, integrated services digital network (ISDN), digital subscriber line (DSL), and asynchronous transfer mode (ATM), as well as other known communications technologies. Similarly, the networking protocols used on a network to which kiosk(s) 12 and central host 14 are interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. Further, the data exchanged over such a network may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as, for example, the secure sockets layer (SSL), Secure HTTP and/or virtual private networks (VPNs), the international data encryption standard (DES or IDEA), triple DES, Blowfish, RC2, RC4, R5, RC6, as well as other known data encryption standards and protocols. In other embodiments, custom and/or dedicated data communications, representation, and encryption technologies and/or protocols may be used instead of, or in addition to, the particular ones described above. Further, it will be appreciated that in an illustrative embodiment, central host 14 and kiosk(s) 12 may each be configured to communicate with each other using more than one communication technique or protocol as a fail-safe so as to provide redundancy and flexibility in the event a given technique or protocol is rendered unusable for any reason, or different components communicate using different protocols or techniques.

In an embodiment wherein multiple kiosks 12 are networked together, the distance from one kiosk to another may range from a matter of feet (e.g., within a single building), to an unlimited number of miles (e.g., distributed globally). Accordingly, it will be appreciated that the particular communication techniques and protocols used may depend in large part on the relative distance between central host 14 and kiosks 12 and/or between the individual kiosks 12, as well as on the availability of certain infrastructure required for the various techniques/protocols (e.g., cellular reception, existence of PSTN lines, etc.). Additional functionality and features provided by a network comprising a plurality of kiosks 12 and central host 14 will be described below.

As will be appreciated in view of the foregoing, system 10 may be configured to allow users such as, for example, service technicians, operations personnel, administrators, customers, and potential customers, and one or more components of system 10 (e.g., kiosk 12, central host 14, etc.) to interface, communicate, and in certain instances, interact with each other for a variety of purposes, some of which will be described below. This communication (whether one-way or two-way) and/or interaction may be facilitated at least in part by one or more user interfaces, such as, for example, user interface mechanism(s) 16 or user interface(s) 22 described above and illustrated in FIG. 1. It will be apparent from the description above that one purpose of allowing users to interface and communicate with system 10 is to facilitate the placement of orders for beverages and, if applicable, other goods that may be offered at a particular kiosk 12. Orders may be placed and processed in a number of ways, such as, for example, directly at a particular kiosk, or alternatively, through central host 14.

With respect to the first instance where orders may be placed directly at kiosk 12, such orders may be placed in a variety of ways. For example, kiosk 12 may include a user interface mechanism 16, such as, for example, touch screen 54 illustrated in FIG. 5, that is configured to display a user interface (e.g., GUI) having one or more user-inputtable or user-selectable fields or links thereon to facilitate the ordering process. In such an embodiment, ECU 18, or some other suitable component, may be configured to control the user interface mechanism 16 to display the user interface thereon. A customer may then interact with the user interface mechanism 16 to place an order for a beverage and, if applicable, to customize the beverage. In another embodiment, orders may also or alternatively be placed directly at kiosk 12 using, for example, one or more user interfaces 22 that, as described above, is/are not part of kiosk 12 per se. More particularly, in an embodiment wherein a user input device, such as, for example, a smart phone, personal computer, etc., and a component of kiosk 12, such as, for example, ECU 18, are both connected to a local network (e.g., Wi-Fi, Bluetooth, etc.), a user interface 22 in the form of one or more graphical or text-based interfaces generated by, for example, application software stored on the user device or communicated to the user device by the ECU 18, may be displayed thereon and used to facilitate the ordering process.

Regardless of which method is used to place an order locally at a kiosk, in an illustrative embodiment, the ordering process is the same. For example, in one embodiment, using a user interface such as user interface $24_1$ depicted in FIGS. 2 and 3, a user may select a desired beverage from among a plurality of different beverage options. The beverage options may include standard beverages produced by the kiosk or, in certain instances, may include a list of beverages that a customer has indicated are his favorites or that he has recently ordered. Each beverage may be represented by a dedicated field (e.g., fields $26_1$) and the user may interact with user interface to select a particular beverage by, for example, clicking or otherwise selecting the field corresponding to the desired beverage.

Once a particular beverage or beverage type has been selected, in certain embodiments, the user may be permitted to customize or modify the selected beverage. In such an instance, this may be accomplished through a user interface, such as, for example, user interface $24_2$ illustrated in FIG. 3. Accordingly, as shown in FIG. 3, the user interface may include a number of fields (e.g., fields $26_2$ of interface $24_2$ illustrated in FIG. 3) representing selectable customization options, including, for example, various additives or ingredients that may be added to or used in the production of the beverage, from which the customer may make one or more selections. It will be appreciated that in certain instances, the beverage may be further customized by allowing a customer to select particular amounts or specific types of additives to be added to, or used in the production of, the beverage, as well as to make selections relating to other parameters of the beverage, such as, for example, a temperature the customer would like the beverage to be at when it is presented to him, the size of the beverage, etc.

Whether or not an ordered beverage may be or is customized, once a customer has completed his order, the order may be submitted by the user selecting or clicking an order placement field of the user interface (e.g., order placement field $26_4$ of interface $24_2$), and ECU 18 may then either immediately initiate the production of the ordered beverage (i.e., by controlling one or more process modules 20, for example), or may cause the order to be entered into a production queue maintained and managed locally at kiosk 12 or remotely at central host 14, in which case the initiation of the production of the ordered beverage may be delayed until a particular time in the future. Kiosk 12 may be further configured to store specific information relating to the order in, for example, a memory device thereof, for example, memory device 29 of ECU 18. This information may include, for example, information relating to the customer, the recipe for the ordered beverage, etc.

As briefly described above, another way in which orders may be placed or processed is through central host 14 when a user is located remotely from a kiosk and outside of the range of a local network corresponding thereto. More particularly, and as is known in the art, customers may interact with central host 14 using user interfaces 22 in the form of one or more GUIs or text-based interfaces, for example, generated by application software and displayed on a user device, such as, for example, a personal computer, a smart phone, a tablet, and/or other suitable devices. These one or more interfaces, which may take the same or similar form as those illustrated in FIGS. 2 and 3 (interfaces $22_1$, $22_2$ in FIGS. 2 and 3, respectively), may then be used by a user/customer to make various selections relating to, for example, the desired beverage and the customization of the beverage in the same manner described above. In certain embodiments, and as will be described in greater detail below, the user may be further allowed to make additional selections relating to, for example, the particular kiosk at which the beverage is to be generated (e.g., using location selection field $26_3$) and/or a time at which the beverage will be picked up (e.g., using time entry selection field $26_5$).

Once the user/customer has completed his order, the order may be submitted by the user selecting or clicking an order placement field of the user interface (e.g., order placement field $26_4$), and communicated to central host 14. Central host 14 may then relay the order to the appropriate kiosk at which the customer will retrieve the ordered beverage along with, in certain embodiments, specific information relating to the order (e.g., recipes to be used, time at which to produce the beverage, customer identifying information, etc.). In addition to relaying the order to the appropriate kiosk, in an embodiment, central host 14 may be further configured to store specific information relating to the order in a database thereof. This information may include, for example, information relating to the customer, information relating to the particular kiosk to which the order was sent, the recipe for the ordered beverage, etc. That information may be relayed to the kiosk 12 so that kiosk 12 may update locally stored data/information.

It will be appreciated that while certain functionality relating to the placement of orders has been described above, the present disclosure is not meant to be limited solely to such functionality and/or the particular implementations thereof. Rather, it will be appreciated that in various embodiments, additional functionality and/or alternate implementations of the functionality described above may be included, such as, for example, that described in U.S. Patent Publication No. 2012/0156337 incorporated herein by reference above.

In addition to the order submission and processing functionality described above, in various embodiments, central host 14 and/or kiosk 12 may be configured to perform additional functionality, including, for example, functions that may be performed during the order placement process, the production of a beverage ordered by the customer, and/or at any other time. This functionality may be performed at least in part through or by one or more user interface mechanisms 16 of kiosk 12 or user interfaces 22 of system 10. For example, and as will be described in greater detail below, one or both of kiosk 12 (e.g., processing unit 27 of ECU 18) and central host 14 (e.g., processing unit 72) may be configured to allow one user to share a recipe for a particular beverage with another user, and/or to gift a beverage to another user. Other additional or alternative functionality is certainly possible as well.

The preceding description of system 10 and the illustration of system 10 shown in FIG. 1 is only intended to illustrate one system arrangement, and to do so in a general way. It is certainly contemplated that any number of other system arrangements and architectures, including those that differ significantly from the one shown in FIG. 1, may be used instead.

Referring now to FIG. 7, there is shown a method 100 of facilitating the ordering and generation of a beverage. For purposes of illustration and clarity, method 100 will be described in the context of system 10 described above. It will be appreciated, however, that the application of the present methodology is not meant to be limited solely to such an implementation, but rather method 100 may find application with any number of other systems. Additionally, it should be noted that while the steps of method 100 will be described as being performed or carried out by one or more particular components of system 10 (e.g., the ECU 18 of kiosk 12 or processing unit 72 of central host 14), in other embodiments some or all of the steps may be performed by other components. Accordingly, it will be appreciated that the present disclosure is not limited to an embodiment wherein particular components described herein are configured to perform the various steps. Additionally, unless otherwise noted, the performance of method 100 is not meant to be limited to any one particular order or sequence of steps.

In an embodiment, method 100 includes a step 102 of receiving one or more electrical signals representative of an instruction from a first user to share a recipe with one or more recipients, i.e., users (e.g., a second user). In an embodiment, the signal(s) received in step 102 are received in response to an input provided by the first user via a user-inputtable or user-selectable field on a user interface, for example, a user interface that comprises or is displayed one of user interface mechanisms 16 (e.g., user interface $24_2$ in FIG. 3) or that comprises one of user interfaces 22 (e.g., user interface $22_2$ in FIG. 3). By way of illustration user interface $22_2/24_2$ illustrated in FIG. 3 includes a "share" field $26_6$ that allows for the first user to provide an instruction to share a recipe. The first user may provide this instruction before or after an order has been placed for the beverage (if an order is even placed), but in any event after the user defines the recipe using, for example, one or more user interfaces (e.g., user interfaces $22_1/24_1$, $22_2/24_2$ shown in FIGS. 2 and 3). In an embodiment, the electrical signal(s) received in step 102 are received by ECU 18 of kiosk 12. In another embodiment, the electrical signal(s) are received by central host 14. Accordingly, depending on the implementation, step 102 may be performed by either kiosk 12 or central host 14 of system 10, and as such, the present disclosure is not intended to be limited to any particular component being configured to perform step 102.

Following step 102, method 100 comprises a step 104 of generating an electronic link corresponding to the recipe being shared. In an embodiment, the link contains a uniform resource locator (URL) that when activated (e.g., clicked) by a second user with whom the recipe is being shared, directs or routes the second user to a beverage ordering mechanism (e.g., website) that will allow the second user to order a beverage. The link may also include the recipe itself, a representation thereof, or a unique identifier associated therewith that can be used to determine the recipe. In an embodiment wherein the link includes an identifier associated with the recipe, the unique identifier may be associated with or assigned to the recipe in response to the receipt of the instruction in step 102 to share the recipe, and may be stored along with the recipe in a data structure (e.g., look-up table) that correlates unique identifiers with beverage recipes to allow for the recipe to be acquired following the activation of the link. Depending on the implementation, the data structure may be stored in or on a suitable memory device of one or both of central host 14 (e.g., memory device 74) and kiosk 12 (e.g., memory device 29 of ECU 18 of kiosk 12). In addition to the above, in some embodiments, the link may further include or contain additional information and/or instructions, or representations of such information and instructions, including, for example and without limitation, one or a combination of: the location at which to generate a beverage ordered following the activation of the link; an account number of the first and/or second user; a identification number of the beverage corresponding to the recipe; a command to cause a beverage corresponding to the recipe to be automatically generated; and a command to search for the nearest location at which a beverage corresponding to the recipe may be generated; a command or instruction as to how to share the recipe (which is described below with respect to step 106), to cite only a few possibilities.

By way of illustration only, an example of a link containing a unique identifier corresponding to a recipe and an instruction or command to share the recipe via Facebook® is "https://qa01.briggo.com/favorite/Tlu6VhfTSom95KAF5xEEVQ/?fb_ref=Default". An example of a link containing a representation of the location at which to generate a beverage ordered via activation of the link, a representation of a beverage recipe, a representation of a time to generate or produce the beverage corresponding to the recipe, and a representation of an authorization string that commands central host 14 and/or kiosk 12 to generate the beverage at the specified time and to obtain payment for the beverage is "https://qa91.briggo.com/order?kiosk=unit7&drink=latte&milk=2percent&sweetner=splenda&swpumps=3&flavor=vanilla&flavorpumps=2.5& . . . &date=150720&time=1422& . . . &authorization==d305b16061624979afbacdf0506531af". An advantage of this link is that by encoding with, for example, the recipe itself (as opposed to a unique identifier), memory storage requirements at central host 14 and/or kiosk 12 are alleviated. Finally, an example of link that would enable a beverage to be ordered even in the event of a failure of a recipe unique identifier look-up by bypassing central host 14 and addressing kiosk 12 directly is "https://unit7.briggo.com/order? . . . ". Accordingly, any number of links containing a variety of information may be generated in step 104.

In an embodiment, the link is generated by ECU 18 of kiosk 12; while in another embodiment it is generated by central host 14. Accordingly, depending on the implementation, step 104 may be performed by either kiosk 12 or central host 14 of system 10, and as such, the present disclosure is not intended to be limited to any particular component being configured to perform step 104. In any event, the link may be generated using link generation techniques well known in the art.

Once the link is generated in step 104, method 100 may move to a step 106 of communicating the electronic link to one or more recipients or users (e.g., the second user). The link may be communicated in a number of ways, such as, for example, over a predetermined electronic communications medium. For example, the electronic link may be communicated to one or more recipients via electronic mail, text message (e.g., short message service (SMS)), or using another suitable targeted communication technique or medium (i.e., techniques where the user selects or identifies particular recipients with whom the recipe is to be shared). In such an embodiment, step 106 would include obtaining an electronic mail address, telephone number, IP address, etc. for or corresponding to each of the intended recipients and that may be used to communicate the link. This may comprise prompting the user sharing the recipe (i.e., the first user) to provide the necessary information via one or more user-selectable or user-inputtable fields on a user interface (e.g., the same or different user interface from which the instruction to share the recipe is provided).

Figure 6:
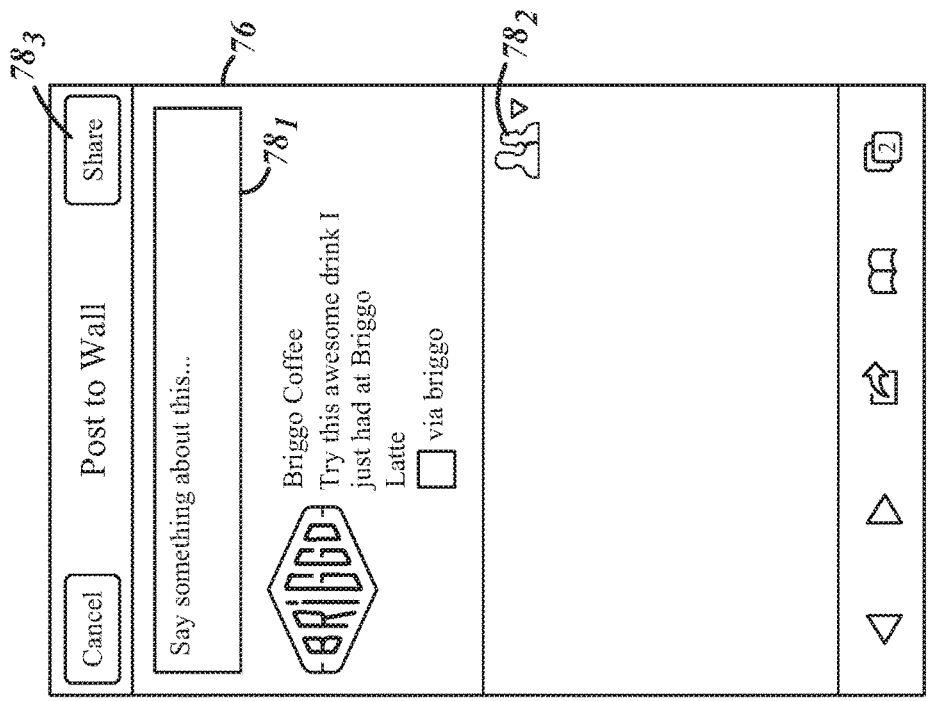
FIG. 6 illustrates an illustrative embodiment of another GUI that may be used to share/gift beverage recipes.

Additionally or alternatively, the link may be communicated to one or recipients via an electronic communications medium in the nature of an online social networking service, such as, for example, Twitter®, Facebook®, or some other like service. In an embodiment, the link may be posted to a public space (e.g., wall) of the first user; or alternatively, the link may be sent specific individuals or group(s) of individuals who have access to the social networking service. In such an embodiment, step 106 may comprise causing a user interface of the relevant social networking service to be displayed for the first user to utilize and ultimately effect the sharing of the recipe. In an embodiment, the first user may be required to first provide relevant credentials before the user interface of the social networking service is generated and displayed. In any event, to better illustrate, FIG. 6 illustrates a user interface 76 of a social networking service that may be displayed in response to the receipt of the instruction to share the recipe in step 102. This user interface may include one or more user-selectable or user-inputtable fields that the first user may utilize to share the recipe, and may also allow the first user to indicate with whom the recipe is to be shared. For example, user interface 76 may include a field $78_1$ to allow the first user to provide commentary about the recipe or corresponding beverage, a field $78_2$ to allow the first user to select the recipients, and a field $78_3$ to allow the user to effect the sharing of the recipe. It will be appreciated that the user interface may also include other fields for other purposes.

It will be appreciated in view of the foregoing, that any number of techniques and electronic communications media may be used in step 106 to communicate the link generated in step 104, and as such, the present disclosure is not intended to be limited to any particular technique(s) for doing so. Additionally, as with steps 102 and 104, the component that is configured to perform step 106 is dependent upon the particular implementation of system. In one embodiment, ECU 18 of kiosk 12 may be configured to perform step 106; while in another embodiment, central host 14 may be so configured. Accordingly, the present disclosure present disclosure is not intended to be limited to any particular component being configured to perform step 106.

Following the communication of the link in step 106, method 100 comprises a step 108 of receiving an electrical signal responsive to the activation (e.g., clicking) of the link by one of the recipients (e.g., the second user). The activation of the link serves as an indication that the second user may be interested in ordering the beverage corresponding to the shared recipe or, in some embodiments, a modified version thereof, and directs or routes the user to a beverage ordering mechanism. The electrical signal received in step 108 may be generated by the device used to activate the link. In one embodiment, that device may comprise a user device (e.g., smart phone, tablet, personal computer, etc.). The particular component that receives the electrical signal in step 108 will be dependent on the particular implementation of system 10. In an embodiment, step 108 may be performed by ECU 18 of kiosk 12; while in another embodiment, step 108 may be performed by central host 14. Accordingly, the present disclosure present disclosure is not intended to be limited to any particular component being configured to perform step 108.

In response to the receipt of the electrical signal in step 108, method 100 includes a step 110 of generating a user interface on which the recipe being shared may be displayed for the second user to view (e.g., certain fields of the user interface may be automatically populated in accordance with the recipe), and with which the second user may interact to place an order for the beverage corresponding to the recipe. In other words, activation of the link in step 108 may result in some of the initial ordering functions being performed, such as, for example, the defining of one or more parameters of a beverage being ordered, without involvement on the part of the second user. The user interface generated in step 110 may comprise or be displayed on one of user interface mechanism(s) 12, or may comprise one of user interface(s) 22. In an embodiment, the user interface may comprise the user interface $22_2/24_2$ shown in FIG. 3, and as such, may include a user-selectable or user-inputtable order placement field $26_4$ that may be used by the second user to place an order for the beverage corresponding to the recipe. The user interface generated in step 110 may also include additional fields, for example, a field to allow the second user to save the recipe in a record corresponding to the second user and stored in or on a memory device of system 10, a field to allow the second user to add the recipe to a list of the second user's favorite recipes (e.g., field $26_7$ on interface $22_2/24_2$ in FIG. 3, which, incidentally, also results in the recipe being saved), among potentially others.

In addition to generating a user interface, step 110 may also include acquiring the recipe being shared so that it may be displayed on the user interface. In an embodiment, wherein the signal received in step 108 contains the recipe or a representation of the recipe, the component performing step 110 may interpret the received signal and acquire the recipe. In an embodiment wherein the received signal contains a unique identifier associated with the recipe, the component performing step 110 may look up the identifier in an appropriately configured data structure and acquire the recipe. It will be appreciated that other suitable ways of acquiring the recipe may certainly be used in addition to or in lieu of those described above. Additionally, while in an embodiment the acquisition of the recipe is part of step 110, in other embodiments the acquisition may be part of step 108 or may comprise a separate step of method 100 that may be performed before step 110.

In any event, and as with the other steps of method 100 described above, the particular component that performs step 110 will be dependent on the particular implementation of system 10. In an embodiment, step 110 may be performed by ECU 18 of kiosk 12; while in another embodiment, step 110 may be performed by central host 14. Accordingly, the present disclosure present disclosure is not intended to be limited to any particular component being configured to perform step 108.

In an instance where the second user takes the necessary steps to place an order for a beverage (e.g., clicks or otherwise selects the order field of the user interface generated in step 110), method 100 comprises a step 112 of receiving the order for the beverage. In other words, in an embodiment, step 112 comprises receiving an order for the beverage responsive to an input made by the second user via the order field (e.g., field $26_4$) of the user interface (e.g., user interface $22_2/24_2$) generated in step 110 commanding that the beverage be produced. In an embodiment, step 112 comprises receiving one or more electrical signals representative of an instruction to generate the beverage, and that may or may not also contain the recipe or a representation/identifier corresponding thereto that the component configured to generate the beverage uses to determine which beverage to generate. It will be appreciated that in at least some embodiments, the electrical signal(s) received in step 112 are different signal(s) than that or those received in step 102. In any event, the particular component that receives the order in step 112 will be dependent on the particular implementation of system 10. In an embodiment, ECU 18 of kiosk 12 may receive the order; while in another embodiment central host 14 may receive the order. Accordingly, the present disclosure present disclosure is not intended to be limited to any particular component being configured to perform step 112.

In dependence on or responsive to the receipt of an order in step 112, method 100 comprises a step of commanding the generation of the ordered beverage. In an embodiment wherein the order is received directly by ECU 18 of kiosk 12 in step 112, step 114 may comprise ECU 18 controlling one or more process modules 20 and/or other components of kiosk 12 to generate the beverage. More particularly, using techniques known in the art, the order received in step 112 may be translated into one or more commands that are then sent to and/or executed by one or more component(s) of the kiosk to generate the beverage.

In an embodiment wherein the order is received by central host 14, step 114 may comprise commanding an apparatus for generating a beverage, which, in an embodiment, may comprise a fully or semi-automated kiosk (e.g., kiosk 12 of system 10, or one of kiosks 12 of system 10 in an embodiment wherein system 10 includes a plurality of kiosks 12), to generate the beverage. In such an embodiment, step 114 may comprise sending one or more electronic command signals to the appropriate apparatus (e.g., kiosk 12). The command signal(s) received in step 114 are different than the signals received in each of steps 102 and 112, and may comprise a command or instruction to generate the beverage, as well as information relating to the ordered beverage (e.g., recipe, recipe identifier that may be used to acquire the recipe, information relating to the second user, etc.). In an embodiment, upon receipt by kiosk 12 the command signal(s) may be into one or more machine commands or instructions that are executed by one or more components of kiosk 12 to generate the beverage (e.g., the ECU 18 receives the command signal(s), translates the received signal(s) into machine executable instructions, and causes one or more process modules to each execute instruction(s) to perform task(s) required to generate the beverage). The particular manner or way in which the signal(s) received in step 114 are translated is outside of the scope of this disclosure; however, one of ordinary skill in the art will understand and appreciate how such a translation may be carried out or performed.

Alternatively, rather than kiosk 12 performing the translation of the order into commands/instructions, the translation may occur at central host 14 and the signal(s) received in step 114 may comprise both an instruction to generate the beverage, as well as the machine command(s) or instruction(s) required to be executed by components of kiosk 12 to generate the beverage (e.g., the ECU 18 receives the command signal(s) and causes one or more process modules of the kiosk to each perform one or more tasks required to generate the beverage). In an event, the command signal(s) sent in step 114 may be communicated over a communications network, which, as described above, may comprise any suitable wired or wireless network. Upon receipt of the command signal(s), step 114 further comprises the actual generation of the beverage.

In an event, depending on the particular implementation of system 10, step 114 may be performed by kiosk 12 alone, by a beverage generating apparatus (e.g., kiosk 12) in conjunction with central host 14, or in any other suitable manner. Thus, the present disclosure is not intended to be limited to any particular component(s) being configured to perform step 114.

In at least some embodiments, in addition to allowing the second user to provide an input to command the production of the beverage (i.e., step 112), method 100 may also allow for the second user to provide inputs relating to the beverage/recipe and/or the production of the beverage. For example, in an embodiment, method 100 may allow for the second user to modify the recipe before placing an order in step 112. More particularly, the user interface generated in step 110 (e.g., user interface $22_2/24_2$ in FIG. 3) may include one or more recipe modification fields (e.g., field(s) $26_2$) that allow the user to modify one or more aspects or parameters of the shared recipe, for example: the type and/or quantity of certain ingredients; the size of the beverage; the temperature of the beverage; and the latte art used for the beverage, to cite only a few possibilities. For example, and as illustrated in FIG. 3, the user interface may include fields to allow the second user to modify: the type of milk to be used; the number of espresso shots to be included in the beverage; the type of flavor additive(s) and/or the amount(s) thereof (e.g., number of "pumps") to be added to the beverage; the type of sweetener to use; and the size of the beverage. In any event, in such an embodiment, step 110 comprises generating a user interface having said recipe modification fields; step 112 may comprise receiving an order for a modified version of the beverage corresponding to the shared recipe responsive to inputs provided or made by the second user via the recipe modification field(s) and the order placement field; and step 114 may comprise commanding the generation of the modified version of the beverage responsive to the received order and in accordance with the modifications made by the second user.

In any event, regardless of the whether the original recipe is modified by the second user, and once the beverage has been generated in response to or as part of commanding step 114, method 100 may proceed to a step 116 of effecting the presentation of the beverage to the second user at a specified (e.g., first or second user-defined or default) pickup location (i.e., the location at which the beverage was generated). More particularly, in an embodiment, and as described elsewhere above, step 116 may comprise moving or causing the movement of the beverage to the beverage presenter 48 and/or final product collection location 50 of the kiosk at which the beverage was generated. The second user may access the presenter 48/collection location 50 and retrieve the beverage. Accordingly, in an illustrative embodiment, step 116 is performed by the kiosk 12 at which the beverage was generated.

In addition to the above, method 100 may include one or more other steps, some or all of which may be optional. For example, in an illustrative embodiment, method 100 comprises a step 118 of obtaining payment for a purchase price of the beverage. In an embodiment, the purchase price is obtained from the second user prior to at least step 114 and/or step 116 being performed. This payment may be carried out in any number of conventional ways, including, for example, by charging a debit or credit card belonging to the second user, the number and other relevant information of which is stored in, for example, a memory device of system 10 (e.g., memory device 74 of central host 14 and/or memory device 29 of ECU 18 of kiosk 12). Other ways include the purchase price being deducted from an account belonging to the second user, using banked loyalty points that the second user has accumulated, and paying for the beverage in person (e.g., cash or credit/debit) at the location where the second user retrieves the beverage.

In other embodiments, however, steps 102-116 of method 100 may be performed without the second user ever paying a purchase price for the beverage. In such an embodiment, the sharing of the recipe can be thought of as the first user "gifting" the beverage to the recipient(s) of the link (e.g., the second user) communicated in step 106. In such an embodiment, rather than obtaining payment of the purchase price for the beverage from the second user, step 118 comprises obtaining payment of the purchase price for the beverage from the first user. Accordingly, in at least some implementations, method 100 may comprise prompting the first user via, for example, a user interface, to indicate whether the shared recipe is to comprise a gift. If so, method 100 moves to step 118 and payment is obtained from the first user. In an embodiment, this prompting of the first may occur before or after step 102 and/or step 104.

In one embodiment wherein payment is obtained from the first user, the payment may be obtained following (e.g., in response to) the performance of at least one of steps 102, 104, or 106 such that payment is obtained prior to or upon the sharing of the recipe. For example, in an embodiment, payment may be obtained following step 104 but before step 106; while on another embodiment, payment may be obtained following (e.g., in response to) the performance of step 106. In any event, in an instance wherein payment is obtained following one of steps 102, 104, or 106, the particular amount of the payment will be dependent upon the number of recipients or intended recipients of the shared recipe/link. In another embodiment, rather than payment being obtained from the first user following the performance of one of steps 102, 104, or 106, payment may be obtained following the placement of the order by the second user in step 112 such that once the second user places the order for the beverage, payment is obtained from the first user. In other embodiments, payment may be obtained from the first user in step 118 following at least one of steps 114, 116, and/or one or more of the steps described below (e.g., step 120 or step 122). Accordingly, the present disclosure is not intended to be limited to performing step 118 after any particular step in method 100 or at any particular point in time during the performance of method 100.

Regardless of when payment is obtained from the first user, it may be obtained in a number of ways. One way is that the purchase price may be charged to a debit or credit card belonging to the first user. This may comprise prompting the first user to provide the necessary card information, or accessing the required information from a record stored in, for example, the memory device of central host 14 and/or ECU 18 of kiosk 12, that contains the necessary information. The charging of the first user's card may be done automatically without first obtaining the first user's authorization (e.g., when the first user is charged upon the placement of an order in step 112, the first user may not be asked to verify/confirm/authorization the transaction). Alternatively, it may be required that the first user provide such authorization prior to the charging of the card. Other ways payment may be obtained is by deducting the purchase price from a pre-established account belonging to or associated with the first user, using banked loyalty points that the first user has accumulated, and paying for the beverage in person (e.g., cash or credit/debit) when the first user provides instruction to gift the beverage/share the recipe. Accordingly, payment for the purchase price may be obtained from the first user in any number of ways, and as such, the present disclosure is not intended to be limited to any particular way(s).

In an embodiment wherein a beverage is gifted to the second user, the second user may be able to redeem the gift simply by activating the link received by the second user. In such an embodiment, the second user may not be prompted to provide any user information (e.g., the second user need not log in to system 10 or provide any account information), but rather may simply place an order for the beverage. Alternatively, the second user may be prompted to log in but the payment fields of a user interface are either not displayed or reflect a $0.00 price. In either instance, the electric signal received in step 108 may include a flag or some other code to indicate to system 10 (e.g., kiosk 12 or host 14) that the second user need not provide any identifying and/or payment information for a subsequently received order.

In another embodiment, the second user may be prompted to provide certain identifying information in order redeem the gift. For example, following the activation of the link, the second user may be prompted to provide identifying information, such as, for example, the second user's email address, a code (e.g., an alpha, numeric, or alphanumeric code) provided to the second user with the link or separately therefrom, or some other user identifier. The identifying information provided by the second user may then be compared with information stored in a memory device of the system, and if the provided information matches the stored information, the second user is able to place an order and redeem the gift without providing payment for the beverage.

In an embodiment, step 118 is performed by central host 14; though in other embodiments, a different component of system 10 may be configured to perform step 118 (e.g., kiosk 12). Accordingly, the present disclosure is not intended to be limited to step 118 being performed by any particular component(s).

In an instances where system 10 includes a plurality of kiosks, method 100 may further include a step 120 of determining a specific or specified location at which to generate/produce the ordered beverage. In an embodiment, step 120—which may be performed following the receipt of the order in step 112 but prior to the commanding of the generation of the beverage (or the generation of the beverage itself) in step 114—includes receiving information relating to the location of the second user, and then determining the specific location at which to generate the beverage based on the received information. In an embodiment, the location information may be received as part of the electrical signal(s) received in step 108, or along with or as part of the order for the beverage such that one or more electrical signals received in step 112 include both an instruction to generate the beverage and the location information. Alternatively, one or more electrical signals may be received that are separate and distinct from that or those signal(s) received in steps 108 and 112. In any event, the location information may take a number of forms. For example, the location information may comprise global positioning satellite (GPS) information/coordinates corresponding to the location of a user device from which the second user placed the order for the beverage, an internet protocol (IP) address assigned to or associated with the device from which the order was placed, or other suitable information. The location information may be used to identify or select the kiosk that is closest to the user's location as the specified kiosk at which to generate the beverage. This may be accomplished by, for example, looking up the user's location in a database (e.g., look-up table) stored in or on a memory device of system 10 (e.g., memory device of central host 14 or the ECU 18 of one of kiosks 12) to identify the kiosk location closest to the second user's location. In an embodiment, method 100 may further include a step of providing that kiosk's location to the second user so that the second user can retrieve the beverage.

In another embodiment, in addition to or in lieu of receiving information relating to the location of the second user, step 120 comprises receiving information relating to a specific or specified kiosk location at which the beverage is to be generated, and then determining, based on that information, that kiosk's location as being the specified location at which to generate the beverage. In an embodiment, the kiosk location information may be contained in the electronic link generated in step 104, communicated in step 106, and activated in step 108 such that the information is automatically communicated to and/or acquired by the component performing step 120 upon, for example, the activation of the link or the placement of the order by the second user. In other words, the link generated in step 104 is tied to a particular kiosk location. In another embodiment, the kiosk location information may correspond to a user-selection or input made through, for example, a location selection field on the user interface generated in step 110, e.g., field 26₃ on user interface 22₂/24₂. More particularly, the location selection field may be used to select a desired location from a plurality of locations at which the beverage is to be produced/generated. In an embodiment wherein the second user make a location selection, that selection may be included in the order such that step 112 of receiving an order for the beverage comprises receiving an order for the beverage and a selected location at which the beverage is to be generated responsive to inputs made by the second user via the order placement and location selection fields of the user interface generated in step 110. Alternatively, the selected location information may be received separately from the beverage order.

Regardless of how the location at which an ordered beverage is to be generated is determined, in an embodiment wherein such a location is in fact determined, the generating of the beverage in step 114 comprises commanding the appropriate kiosk to generate the beverage based on the determination made in step 120. As discussed above, this may comprise sending one or more command signal(s) to the kiosk and then generating the beverage at that kiosk responsive to the receipt of that or those signal(s).

In an embodiment, step 120 is performed by central host 14; though in other embodiments, a different component of system 10 may be configured to perform step 120. Accordingly, the present disclosure is not intended to be limited to step 120 being performed by any particular component(s).

In at least some embodiments, method 100 may include a step 122 of determining a time, and, in an embodiment, a date and a time, at which to generate/produce the ordered beverage. In an embodiment, step 122—which, as with step 120, may be performed following the receipt of the order in step 112 but prior to commanding the generation of the beverage (or the actual generation of the beverage) in step 114—includes receiving information relating to a time (or date and time) at which to generate the beverage, and then determining the time (or date and time) at which to generate the beverage based on that information.

In an embodiment, the information relating to a time at which to generate the beverage, which may be specified in hour and minute of the day and, in an embodiment, may correspond to a user-selection or input made through, for example, a time entry field on the user interface generated in step 110, e.g., field 26₅ on user interface 22₂/24₂. In an embodiment wherein the second user makes a time selection, the selected time may be included in the order such that step 112 of receiving an order for the beverage comprises receiving an order for the beverage and a selected time at which the beverage is to be generated responsive to inputs made by the second user via the order and time entry fields of the user interface generated in step 110. Alternatively, the time information may be received separately from the beverage order, and/or may not correspond to an input by the second user but rather may be otherwise defined (e.g., it may be contained in the link activated in step 108).

In an embodiment wherein date information is also received, this information may correspond to a user-selection or input made through, for example, a date entry field (not shown) on the user interface generated in step 110. In an embodiment wherein the second user makes a date selection, the selected date may be included in the order such that step 112 of receiving an order for the beverage comprises receiving an order for the beverage and a selected date on which the beverage is to be generated responsive to inputs made by the second user via the order and time entry fields of the user interface generated in step 110. Alternatively, the date information may be received separately from the beverage order, and/or may not correspond to an input by the second user but rather may be otherwise defined (e.g., it may be contained in the link activated in step 108).

In an embodiment wherein a time (or date and time) is entered or selected by the second user, step 114 of commanding the generation of the beverage comprises commanding the appropriate kiosk to generate the beverage at the appropriate time (or date and time) based on the determination made in step 122. As discussed above, this may comprise sending one or more command signal(s) to the kiosk and then generating the beverage responsive to the receipt of that or those signal(s) and/or the information contained therein or represented thereby.

In an embodiment, step 122 is performed by central host 14; though in other embodiments, a different component of system 10 may be configured to perform step 122. Accordingly, the present disclosure is not intended to be limited to step 122 being performed by any particular component(s).

In addition to the above, method 100 may also allow for the second user to share the recipe in its original or modified form with one or more recipients, or to "gift" a beverage corresponding to the recipe to one or more recipients. More particularly, method 100 may include steps (not shown) of receiving an electrical signal representative of an instruction from the second user to share the recipe, generating a second electronic link corresponding to the recipe, and communicating the second electronic link to one or more recipients over, for example, a predetermined electronic communications medium such as one or more of those described above. These steps may be performed in the same or similar manner as steps 102, 104, and 106 described above, and as such, the description of steps 102, 104, and 106 applies here with equal weight and will not be repeated, but rather is incorporated here by reference. As with steps 102, 104, and 106, depending on the implementation, the steps required for the second user to share the recipe or gift a beverage may each be performed by kiosk 12 or central host 14 of system 10, and as such, the present disclosure is not intended to be limited to any particular component being configured to perform one or more of those steps.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for facilitating the ordering and generation of a beverage, comprising:
   receiving one or more electrical signals representative of an order for the beverage specified by a first user;
   sending one or more electronic command signals commanding the generation of the beverage to a beverage generating apparatus at which the beverage may be retrieved by a second user following the generation thereof;
   generating the beverage at the beverage generating apparatus in response to the one or more command signals; and
   effecting the presentation of the beverage to the second user at the beverage generating apparatus following the generation of the beverage.

2. The method of claim 1, further comprising identifying the beverage generation apparatus at which to generate the beverage from a plurality of beverage generating apparatuses, and generating the beverage at the identified beverage generating apparatus.

3. The method of claim 2, wherein the identifying step comprises identifying the beverage generating apparatus based on information relating to a location associated with a second user.

4. The method of claim 1, wherein the beverage generating apparatus comprises an automated beverage generating kiosk.

5. The method of claim 1, wherein the steps thereof are performed without receiving payment of a purchase price for the beverage from the second user.

6. The method of claim 1, wherein before the generating step, the method comprises determining a time at which to generate the beverage.

7. The method of claim 6, wherein the time is specified in hour and minute of the day.

8. The method of claim 1, further comprising sending the second user a notification relating to when the beverage may be retrieved at the beverage generating apparatus, the location of the beverage generating apparatus, or both.

9. A system for facilitating the ordering and generation of a beverage, comprising:
   an electronic processing unit; and
   an electronic memory device electrically coupled to the electronic processing unit and having instructions stored therein,
   wherein the processing unit is configured to access the memory device and execute the instructions stored therein such that it is configured to:
   receive one or more electrical signals representative of an order for the beverage specified by a first user; and
   send one or more electronic command signals commanding the generation of the beverage to a beverage generating apparatus at which a second user may retrieve the beverage following the generation thereof.

10. The system of claim 9, wherein the processing unit is further configured to identify the beverage generating apparatus at which to generate the beverage from a plurality of beverage generating apparatuses.

11. The system of claim 10, wherein the processing unit is configured to identify the beverage generating apparatus based on information relating to a location associated with a second user.

12. The system of claim 9, wherein the beverage generating apparatus comprises an automated beverage generating kiosk.

13. The system of claim 9, wherein the processing unit is configured to determine a time at which to generate the beverage.

14. The system of claim 13, wherein the time is specified in hour and minute of the day.

15. The system of claim 9, wherein the processing unit is configured to receive the order for the beverage and send the one or more command signals to the beverage generating apparatus without receiving payment of a purchase price for the beverage from the second user.

16. The system of claim 9, wherein the processing unit is configured to send the second user a notification relating to when the beverage may be retrieved at the kiosk, the location of the kiosk, or both.

17. The system of claim 9, comprising:
a central host, wherein the central host comprises the electronic processing unit and the electronic memory device; and
a kiosk configured for communication with the central host and including a plurality of process modules each configured to perform one or more processes contributing to the production of beverages,
wherein the processing unit of the central host is configured to:
send the one or more command signals to the kiosk commanding the generation of the beverage responsive to the received order; and
wherein the kiosk is configured to:
receive the one or more command signals from the processing unit of the central host;
generate the ordered beverage responsive to the received command signal(s); and
present the beverage to the second user following the generation of the beverage.

18. The system of claim 17, wherein the processing unit of the central host or the kiosk is configured to send the second user a notification relating to when the beverage may be retrieved at the kiosk, the location of the kiosk, or both.

19. The system of claim 17, wherein the system comprises a plurality of kiosks, and the processing unit of the central host is configured to identify the kiosk at which to generate the beverage from the plurality of beverage generating apparatuses.

20. The system of claim 19, wherein the processing unit is configured to identify the kiosk based on information relating to a location associated with a second user.

* * * * *